(12) United States Patent
Harris

(10) Patent No.: US 6,912,621 B2
(45) Date of Patent: Jun. 28, 2005

(54) METHOD AND APPARATUS FOR UPDATING DATA IN MASS STORAGE SUBSYSTEM USING EMULATED SHARED MEMORY

(75) Inventor: Kenneth M. Harris, Lafayette, CO (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 10/124,072

(22) Filed: Apr. 17, 2002

(65) Prior Publication Data

US 2003/0200398 A1 Oct. 23, 2003

(51) Int. Cl.⁷ .............................................. G06F 12/00
(52) U.S. Cl. ...................... 711/112; 711/147; 711/155; 709/212; 709/213; 709/214
(58) Field of Search .............................. 707/8, 10, 216; 709/212–216, 217, 218; 711/147, 148, 150, 163, 112, 155

(56) References Cited

U.S. PATENT DOCUMENTS

| | | |
|---|---|---|
| 4,989,206 A | 1/1991 | Dunphy, Jr. et al. |
| 5,140,685 A | 8/1992 | Sipple et al. |
| 5,201,040 A | 4/1993 | Wada et al. |
| 5,459,857 A | 10/1995 | Ludlam et al. |
| 5,488,731 A | 1/1996 | Mendelsohn |
| 5,504,882 A | 4/1996 | Chai et al. |
| 5,564,008 A * | 10/1996 | Foster .......................... 345/520 |
| 5,664,098 A | 9/1997 | Bianchi et al. |
| 5,794,063 A | 8/1998 | Favor |
| 5,872,990 A | 2/1999 | Luick et al. |
| 5,924,122 A * | 7/1999 | Cardoza et al. ............. 711/150 |
| 6,073,218 A | 6/2000 | DeKoning et al. |
| 6,148,369 A | 11/2000 | Ofer et al. |
| 6,289,375 B1 * | 9/2001 | Knight et al. ............... 709/217 |
| 6,519,594 B1 * | 2/2003 | Li ................................. 707/10 |
| 6,578,033 B1 * | 6/2003 | Singhal et al. ................ 707/8 |

OTHER PUBLICATIONS

"Direct Memory Access Controller for DASD Array Controller," IBM Technical Disclosure Bulletin, vol. 37, No. 12, Dec. 1994, pp. 93–97.

"Hierarchical RAID," Research Disclosure, No. 437103, Sep. 2000, 1 pg.

* cited by examiner

Primary Examiner—T Nguyen
(74) Attorney, Agent, or Firm—Arthur J. Samodovitz

(57) ABSTRACT

A method and apparatus is disclosed wherein a first structure in a memory of a controller for sharing information is defined and a hidden structure containing control information for sharing information with the first defined structure is created. Data is synchronized between controllers so that firmware development is simplified. The user defines a structure and through the use of macro calls makes that structure shared. Lock rules are provided, to perform synchronization and buffer management. Failover and failback are also addressed to provide a comprehensive solution for sharing work and information between controllers. Accordingly, the emulated shared memory mechanism allows a programmer to define a structure that contains information for sharing without having to reinvent firmware when new features are added to a storage controller.

16 Claims, 11 Drawing Sheets

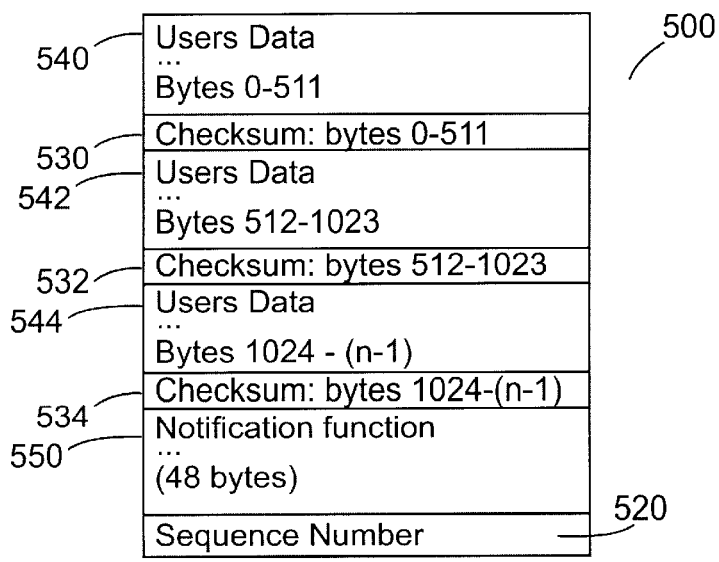
| C0 | C1 | %Perm. Available | Lock Messages | Data Messages | Total Messages |
|---|---|---|---|---|---|
| Read | Read or None | 100% | 0 | 0 | 0 |
| Write/Read | None | 100% | 0 | 1 | 1 |
| Write/Read | Read | 0% | 2 | 0.5 | 2.5 |
| Write/Read | Write/Read | 0% | 2 | 1 | 3 |
| Write/Read | Read | 50% | 1 | 0.5 | 1.5 |
| Write/Read | Write/Read | 50% | 1 | 1 | 2 |
Fig. 4
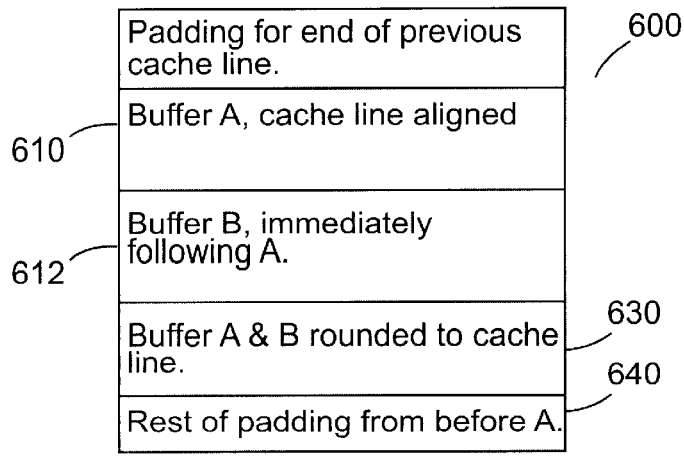
Fig. 5
Fig. 6

METHOD AND APPARATUS FOR UPDATING DATA IN MASS STORAGE SUBSYSTEM USING EMULATED SHARED MEMORY

BACKGROUND OF THE INVENTION

1. Field of the Invention

This invention relates in general to mass storage systems, and more particularly to a method and apparatus for emulating shared memory in a storage controller.

2. Description of Related Art

Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems.

As it is known in the art, computer systems generally include a central processing unit, a memory subsystem and a storage subsystem. According to a networked or enterprise model of a computer system, the storage subsystem associated with or in addition to a local computer system, may include a large number of independent storage devices or disks housed in a single enclosure. This array of storage devices is typically connected to several computers (or hosts) via dedicated cabling or via a network. Such a model allows for the centralization of data which is to be shared among many users and also allows a single point of maintenance for the storage functions associated with the many computer systems.

One solution to these mass storage demands for increased capacity and reliability is the use of multiple smaller storage modules configured in geometries that permit redundancy of stored data to assure data integrity in case of various failures. In many such redundant subsystems, recovery from many common failures can be automated within the storage subsystem itself due to the use of data redundancy, error correction codes, and so-called "hot spares" (extra storage modules which may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled A Case for Redundant Arrays of Inexpensive Disks (RAID), reviews the fundamental concepts of RAID technology.

There are five "levels" of standard geometries defined in the Patterson publication. The simplest array, a RAID level 1 system, comprises one or more disks for storing data and an equal number of additional "mirror" disks for storing copies of the information written to the data disks. The remaining RAID levels, identified as RAID level 2, 3, 4 and 5 systems, segment the data into portions for storage across several data disks. One of more additional disks are utilized to store error check or parity information.

RAID storage subsystems typically utilize a control module that shields the user or host system from the details of managing the redundant array. The controller makes the subsystem appear to the host computer as a single, highly reliable, high capacity disk drive. In fact, the RAID controller may distribute the host computer system supplied data across a plurality of the small independent drives with redundancy and error checking information so as to improve subsystem reliability. Frequently RAID subsystems provide large cache memory structures to further improve the performance of the RAID subsystem. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

To further improve reliability, it is known in the art to provide redundant control modules to reduce the failure rate of the subsystem due to control electronics failures. In some redundant architectures, pairs of control modules are configured such that they control the same physical array of disk drives. A cache memory module is associated with each of the redundant pair of control modules. The redundant control modules communicate with one another to assure that the cache modules are synchronized. When one of the redundant pair of control modules fails, the other stands ready to assume control to carry on operations on behalf of I/O requests. However, it is common in the art to require host intervention to coordinate failover operations among the controllers.

It is also known that such redundancy methods and structures may be extended to more than two control modules. Theoretically, any number of control modules may participate in the redundant processing to further enhance the reliability of the subsystem.

However, when all redundant control modules are operable, a significant portion of the processing power of the redundant control modules is wasted. One controller, often referred to as a master or the active controller, essentially processes all I/O requests for the RAID subsystem. The other redundant controllers, often referred to as slaves or passive controllers, are simply operable to maintain a consistent mirrored status by communicating with the active controller.

The disk devices of a storage system are typically configured to represent one or more so called logical device. A logical device is a way to define a contiguous area of storage space as being available as a distinct addressable unit. The addresses used to access data in a logical device typically need to be translated into physical addresses in order to find the requested data. In many systems, a logical device includes all the addressable storage of a single physical volume (e.g. disk drive). As taught in the prior art, for any particular RAID logical unit (LUN—a group of disk drives configured to be managed as a RAID array), there is a single active controller responsible for processing of all I/O requests directed thereto. The passive controllers do not concurrently manipulate data on the same LUN.

It is known in the prior art to permit each passive controller to be deemed the active controller with respect to other LUNs within the RAID subsystem. So long as there is but a single active controller with respect to any particular LUN, the prior art teaches that there may be a plurality of active controllers associated with a RAID subsystem.

Information and work must be easily and quickly shared between controllers in a loosely coupled dual controller storage subsystem. The controllers are loosely coupled, as the only means of communication is over Fibre Channel connections that are shared with the physical disk drives. These Fibre Channel connections provide only asynchronous communication with high latency. Furthermore, it is tedious and error prone to use the Fibre Channel connections. The programmer must setup buffers for DMA activity, processes for sending data, locking mechanisms to maintain coherency on the shared data, plus failover and failback considerations. Every time a new feature is added that requires work or information be shared between the two controller, many of these pieces are re-invented to fit the exact task that must be performed.

A proven method for easily sharing work and information between multiple processors in a storage subsystem is through the use of shared memory. Shared memory in storage controllers is typically a bank of memory located on its own card connected by low latency busses to a number of processors in the storage system. The processors may have direct memory mapped access to the shared memory. Data that is placed in the shared memory is used to share work between the processors in the system. This shared data is usually under lock control, where rules that programmers must follow govern access to the data based on acquiring the lock.

Some controllers do not have a shared memory, but rather communicate over Fibre Channel connections that are shared with the physical disk drives. It is tedious to use the Fibre Channel connection to share data and work between the two controllers. The programmer must setup buffers for DMA activity, processes for sending data, locking mechanisms to maintain coherency on the shared data, plus failover and failback considerations. Every time a new feature is added that requires work or information be shared between the two controller, many of these pieces are re-invented.

It can be seen that there is a need to emulate shared memory in a storage controller.

It can also be seen that there is a need to emulate shared memory in a storage controller to prevent reinventing firmware when new features are added to a storage controller.

SUMMARY OF THE INVENTION

To overcome the limitations in the prior art described above, and to overcome other limitations that will become apparent upon reading and understanding the present specification, the present invention discloses a method and apparatus for emulating shared memory in a storage controller.

The present invention solves the above-described problems by sharing information and work easily in a loosely coupled dual controller storage subsystem using an emulated shared memory. The emulated shared memory provides ease of use of shared memory without the cost of adding additional hardware. Further, emulating shared memory will centralize the code that is used to share information with other controllers, leading to less firmware maintenance.

A method in accordance with the principles of the present invention includes defining a first structure in a memory of a controller for sharing information and creating a hidden structure containing control information for sharing information with the first defined structure.

Other embodiments of a method in accordance with the principles of the invention may include alternative or optional additional aspects. One such aspect of the present invention is that the creating further comprises preparing the hidden structure using macro calls.

Another aspect of the present invention is that the method further includes maintaining coherency by locking access to information in the hidden structure.

Another aspect of the present invention is that the locking access to the shared information comprises a lock structure, the lock structure locking data in the hidden structure.

Another aspect of the present invention is that the method further includes allowing access to current shared information by furnishing a grant.

Another aspect of the present invention is that the grant allows data to be copied from the hidden structure when the first defined structure does not contain the most current copy of the data.

Another aspect of the present invention is that the grant is released after the data is accessed via the grant.

Another aspect of the present invention is that the data is copied from the first defined structure to another controller before another grant is provided.

In another embodiment of the present invention, a storage controller for controlling a data storage system is provided. The storage controller includes a programmable processor for controlling the operation of said plurality of data storage devices and memory for containing status information and data maintained by said control program, wherein the processor defines a first structure in the memory for sharing information and creates a hidden structure in the memory containing control information for sharing information with the first defined structure.

Another aspect of the present invention is that the hidden structure is hidden from view and shared using macro calls.

Another aspect of the present invention is that the processor maintains coherency of the defined structure and the hidden structure by locking access to information in the hidden structure.

Another aspect of the present invention is that processor further includes a lock structure, the lock structure locking data in the hidden structure.

Another aspect of the present invention is that the processor provides a grant to a user to allow access to current shared information.

Another aspect of the present invention is that the grant allows data to be copied from the hidden structure when the first defined structure does not contain the most current copy of the data.

Another aspect of the present invention is that the grant is released after the data is accessed via the grant.

Another aspect of the present invention is that the processor copies data from the first defined structure to another controller before providing another grant.

In another embodiment of the present invention, a data storage system is provided. The data storage system includes at least one host, a plurality of data storage devices and a plurality of storage controllers for controlling access by the at least one host to data on the data storage devices, wherein each of the storage controllers further includes a programmable processor for controlling the operation of said plurality of data storage devices and memory for containing status information and data maintained by said control program, wherein the processor defines a first structure in the memory for sharing information and creates a hidden structure in the memory containing control information for sharing information with the first defined structure.

Another aspect of the present invention is that the hidden structure is hidden from view and shared using macro calls.

Another aspect of the present invention is that the processor maintains coherency of the defined structure and the hidden structure by locking access to information in the hidden structure.

Another aspect of the present invention is that the processor further includes a lock structure, the lock structure locking data in the hidden structure.

Another aspect of the present invention is that the processor provides a grant to a user to allow access to current shared information.

Another aspect of the present invention is that the grant allows data to be copied from the hidden structure when the first defined structure does not contain the most current copy of the data.

Another aspect of the present invention is that the grant is released after the data is accessed via the grant.

Another aspect of the present invention is that the processor copies data from the first defined structure to another controller before providing another grant.

In another embodiment of the present invention an article of manufacture comprising a program storage medium readable by a computer is provided. The medium tangibly embodies one or more programs of instructions executable by the computer to perform a method for emulating shared memory in a storage controller, wherein the method includes defining a first structure in a memory of a controller for sharing information and creating a hidden structure containing control information for sharing information with the first defined structure.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 4 is a table showing the number of messages incurred per a lock request for the given lock request pattern;

FIG. 5 is a map of a hidden buffer, or half of a dual hidden buffer according to the present invention;

FIG. 6 shows two hidden buffers according to the present invention;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention emulates shared memory so that sharing work and information between two controllers us more robust and easier to program. There is no shared memory on some controllers. The user defines a structure and through the use of macro calls makes that structure shared. Lock rules are provided, to perform synchronization and buffer management. Failover and failback are also addressed to provide a comprehensive solution for sharing work and information between controllers. The emulated shared memory mechanism allows a programmer to define a structure that contains information for sharing.

Figure 1:
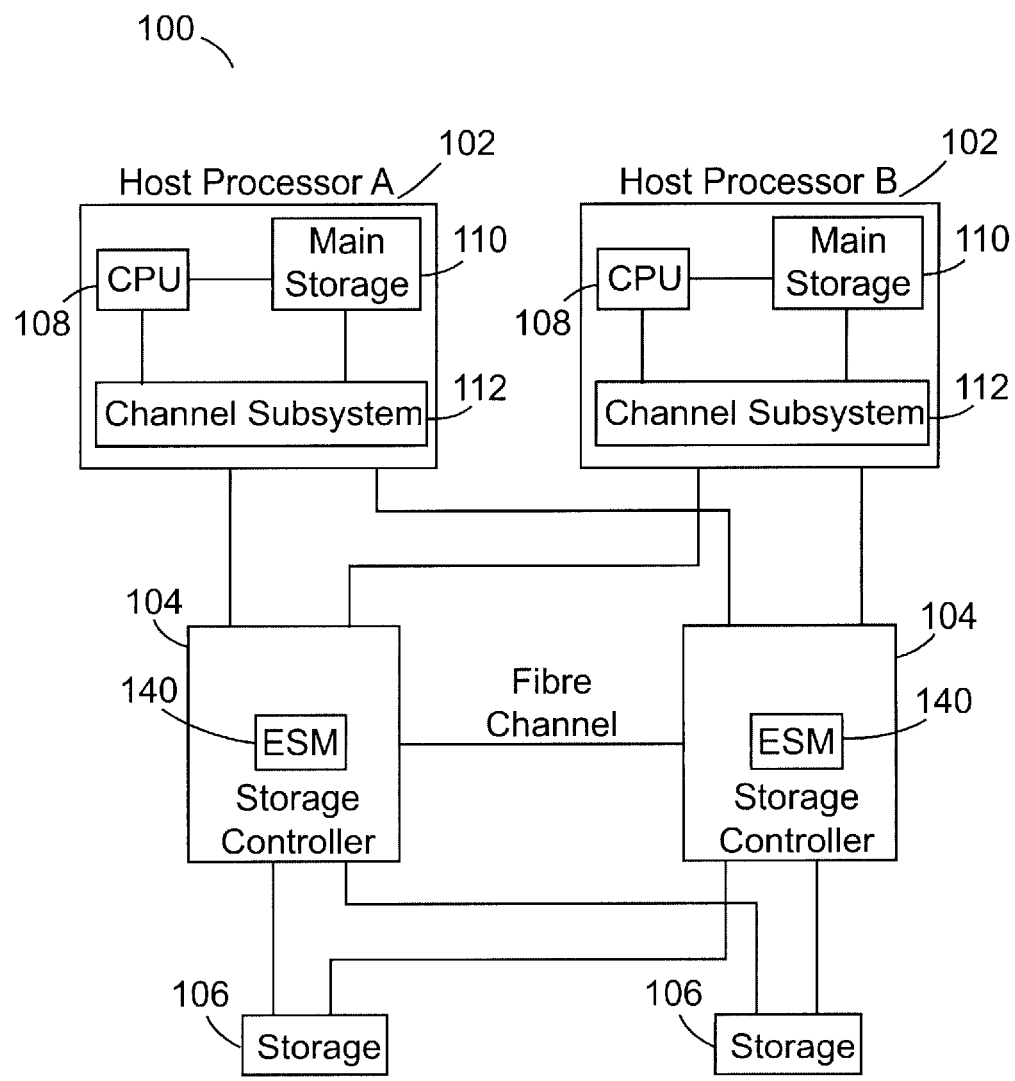
FIG. 1 illustrates one example of a computer system emulating shared memory in a storage controller according to the present invention.

FIG. 1 illustrates one example of a computer system 100 emulating shared memory in a storage controller according to the present invention. Computer system 100 includes, for instance, a plurality of host processors 102, a plurality of storage controllers 104, 105, and one or more storage devices 106. Each of these components is described in detail below.

Each host processor 102 includes, for example, one or more central processing units 108, a main storage 110 and a channel subsystem 112. Central processing units 108 are the controlling center of computer system 100. Each central processing unit 108 contains the sequencing and processing facilities for instruction execution, interruption action, timing functions, initial program loading, and other machine-related functions. Each central processing unit 108 is coupled to main storage 110 and channel subsystem 112.

Main storage 110 is also coupled to channel subsystem 112. Main storage 110 is directly addressable and provides for high-speed processing by the central processing units 108 and the channel subsystem 112 of data stored within the main storage 110.

Channel subsystem 112 is coupled to central processing unit 108 and main storage 110. Channel subsystem 112 directs the flow of information between storage devices 106 and main storage 110. It relieves the central processing units of the task of communicating directly with the storage devices and permits data processing to proceed concurrently with input/output processing. However, the present invention is not meant to be limited to a system that includes a channel system 112.

Host processors 102 are coupled to storage controllers 104, 105. The storage controllers 104, 105 provide the logic to operate and control one or more of the storage devices 106 and adapts the characteristics of each storage device 106 to a link interface. The storage controllers 104, 105 provide for the execution of input/output operations, indications concerning the status of the storage devices 106 and storage controllers 104, 105, and control of the timing of data transfer between the hosts 102 and the storage controllers 104, 105. Additionally, in accordance with the principles of the present invention, the storage controllers 104, 105 are loosely coupled via Fibre Channel and include emulated shared memory 140. The storage controllers 104, 105 are coupled to the one or more storage devices 106. Examples of storage devices 106 include magnetic-tape units, direct-access storage devices (DASD), optical disks, printers, teleprocessing devices, communication controllers and sensor-based equipment, including optical devices.

The computer system 100 described above is only one example and various embodiments may exist. For example, more than two host processors may be attached to the storage controller; each host processor may have a plurality of central processing units; additional storage may be provided within each host processor; and/or any number of storage controllers may be used. Further, the present invention can be used with file servers, workstations and personal computers, as examples. The techniques of the present invention are applicable to any computer system using information stored on a storage device.

Figure 2:
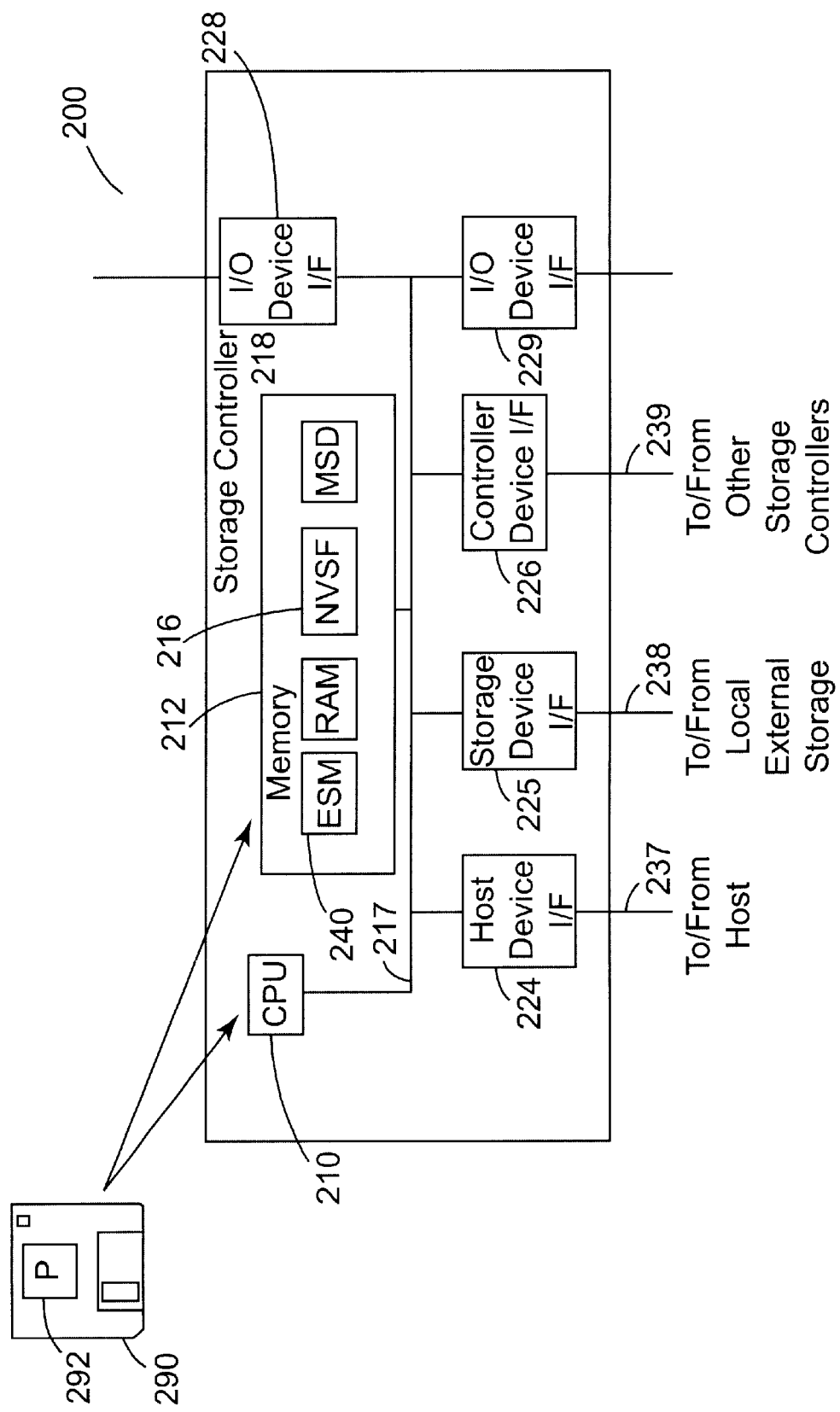
FIG. 2 illustrates the hardware architecture of a storage controller of the present invention according to one embodiment.

FIG. 2 illustrates the hardware architecture of a storage controller 200 of the present invention according to one embodiment. The storage controller 200 includes a central processing unit (CPU) 210 and memory 212, which may include random-access memory (RAM) 214, a non-volatile storage facility (NVSF) 216, an MSD 218, each of which is coupled to a bus 217. Bus 217 may represent multiple physical or logical buses, which may be interconnected by various adapters and/or controllers. Also coupled to the bus 217 are at least one host device interface 224, a storage device interface 225, a controller device interface 226, and input/output (I/O) device interfaces 228 and 229.

The host device interface 224 connects communication path 237 to the bus 217 in order to connect a local host computer to a storage controller 200. The storage device interface 225 connects communication path 238 to the bus 217 in order to connect a local storage array to storage controller 200. From the viewpoint of the local storage array, the storage controller 200 emulates a host device. From the viewpoint of the host device, the storage controller 200 emulates the local storage array. The controller device interface 226 connects communication path 239 to the bus 217 in order to connect a remote storage controller to storage controller 200.

I/O device interfaces 228 and 229 may be used to connect an input/output devices to the bus 217. I/O interface 228 and 229 may therefore be used by a systems administrator to perform various functions, such as initially configuring the storage controller 200, inputting commands and control information to the storage controller 200, or obtaining status information from the storage controller 200. Further, these interfaces 228 and 229 can be used to remotely perform these same functions on a remote storage controller via (local) storage controller 200 and communication link 239.

In one embodiment, the present invention is carried out in the storage controller by the CPU 210 executing sequences of instructions that are contained in memory 212. More specifically, execution of the sequences of instructions contained in the memory causes the CPU 210 to perform steps according to the present invention which will be described below. The present invention is not limited to any specific combination of hardware circuitry and software, nor to any particular source for the instructions executed by a computer system.

The storage controller 200 includes emulated shared memory (ESM) 240. This solves the problem of sharing work and information between controllers easily by keeping the contents of a programmer supplied structure synchronized between controllers. The ESM 240 hides the underling implementation from the programmer. The programmer defines a structure that contains the information to be shared. Through macro calls, this structure is set up to be shared. These macro calls actually create a second structure, hidden from the programmer, that contains control information for sharing the programmer's structure. The programmers structure will be referred to as the shared structure, the hidden control structure is referred to as the hidden structure.

When a programmer needs to access the data in the shared structure, a lock on the shared structure must be obtained. The lock on the data is specifically the lock in the hidden structure. When this lock is granted, if the data in the shared structure is not the most current, then data is copied from the hidden structure's DMA region (data in hidden structure) to the shared structure. Then the programmer may read or write the shared structure. When finished with the shared structure, the programmer must release the lock. Before the lock is granted to another thread, data is copied from the shared structure back to the DMA region, and then DMA'd from that region over the Fibre Channel connection to the partner controller, and stored on the partner controller in the data region on that controller. Once data is safely on the other controller, another thread, possibly on the other controller, may be granted the lock.

There are two DMA buffers in the data region of the hidden structure. When a write lock is released, data is copied from the shared structure over the older of the two buffers. The buffers are then synchronized between the two controllers. If a controller fails while writing data to the other controller, the surviving controller will still have a valid copy of the data in the other buffer. The programmers shared structure is not updated every time the hidden structures data region is updated. This is due to the performance impact of updating the structure when not needed. The most current buffer in the hidden structure is determined by its sequence number. The last element of the each buffer is a sequence number. Every time data is copied to the hidden buffer, the current sequence number is incremented. If the sequence number of the users data matches the most current sequence number when a lock is requested, then coping data to the shared structure is not needed.

In order to keep the hidden buffer hidden from the programmer, the hidden structure is created with a name directly related to the shared structure's name. When the program supplies the shared structure name to a macro to perform any action, request or release the lock, etc, the macro will expand the shared structure name into the hidden structure name. This is also very efficient at run time since the hidden structures address is loaded as a constant.

Figure 3:
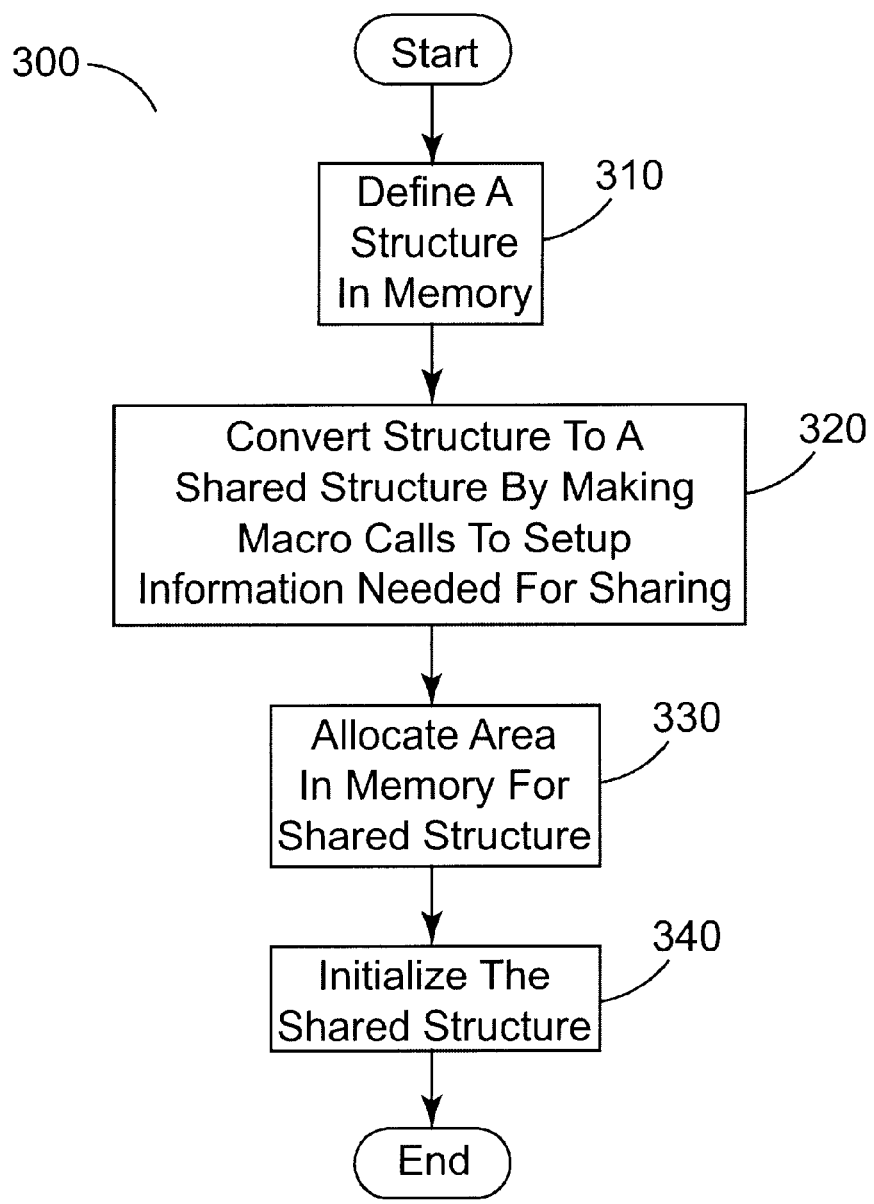
FIG. 3 illustrates a method for emulating shared memory in a storage controller according to the present invention.

FIG. 3 illustrates a method 300 for emulating shared memory in a storage controller according to the present invention. The first step to creating a shared structure is defining the structure to hold the data that must be shared 310. The structure may comprise any format or size, though very large structures will not be efficient. Furthermore, the shared structure may comprise an array of shared structures in which each element of the array is independently shared. Next, the structure is made into a shared structure by making several macro calls 320. The use of macro calls is necessary to set up information needed to perform the sharing of the data between the controllers. The first macro call creates the external declaration for the shared variable or the array of shared variables. For example, a single variable may be created, mySharedMem, of type struct mySharedType, and an array, mySharedArray, of the same type with MY_SHARED_ARRAY_LIMIT indexes.

Now the shared structure and array are defined, but no storage has been allocated for them yet. To allocate storage for the shared structure macro declarations need to be made 330. These declarations do not need to be limited to DMA capable space, but, as one example, may include any C file.

Before the structure and array can be used, they must be initialized 340. Initialization sets up the structures for DMA, the semaphore for locking, as well as the lists for failover and failback. This initialization routine is called before a lock is requested for the shared structures. These initialization routines are called before the controller to controller messages are enabled, before the controller has a chance to failover, and should only be called once. After these calls, the shared structures are all ready to be used.

To use the shared structure, rules must be followed. If the rules are not followed, this mechanism will not provide benefit to the user, as the data being sharing will not be coherent. The rules include the following:

Access to the shared structure can only be made with a lock, except before the initialization routine is called.

Read accesses may be made with a write lock or a read lock.

Any changes to the shared data must be made with a write lock.

The above rules may be enforced through the use of asserts. However, not all rule violations can be caught during regression, unit, or system test. Problems due to lock rule violations are typically difficult to recreate, and usually only show up when the code has been shipped to customers. They are also very difficult to identify, as the symptoms differ depending on the feature being implemented and the nature of the bug. Therefore, implementations should be designed carefully to ensure that the locks are used correctly and in a simple and strait forward way.

Lock requests are made with a callback function. When the callback function is executed, the lock has been granted to the requester. Lock queuing is described in greater detail herein below. The callback function is executed at scheduler priority, allowing the user to perform any system task. The callback function uses a standard form in which, for example, ten arguments may be provided. The callback function is also described in greater detail herein below. The user may request read or write permissions, depending on feature implementation needs. When read permissions are granted, any number of other threads, on both controllers, may also have read permissions at the same time. When write permissions are granted, they are exclusive so no other threads on either controller will have access. The lock request calls are actually macro calls, used to set up information for DMA and lock activity. Pointers cannot be used to specify the shared structure to use, the actual shared structure variable must be passed in.

Examples of requesting read and write locks on mySharedMem and mySharedArray as shown below.

```
shared MemRequestRead (mySharedMem, d  (callMeWhenRead Locked,
2, info1, info2));
sharedMemRequestRead (mySharedArray[index],
(callMeWhenReadLockedArray, 3, index, info1, info2));
sharedMemRequestWrite (mySharedMem,   (callMeWhenWriteLocked,
2, info1, info2));
sharedMemRequestWrite (mySharedArray[index],
(callMeWhenWriteLockedArray, 3, index, info1, info2));
```

The callback function, callMeWhenReadLocked, takes two parameters. The callback function, callMeWhenReadLockedArray, takes three parameters, where the first parameter, index, is used to identify which element of the array is locked, as each element is under the control of its own lock. The write lock calls are similar.

When all accesses to the shared structure are finished, the lock on the structure must be released. Pointers cannot be used to specify the shared structure to use, the actual shared structure variable must be passed in. When a write lock is released, the entire structure is copied into a buffer and sent to the partner controller. This copy may take some time to finish, so the user may want to wait until the data is safely stored on the other controller. This is accomplished by providing an optional callback function with the structure release.

sharedMemRelease (mySharedMem, (callMeWhenDataSyncDone, 1, info1));

sharedMemRelease (mySharedArray[index], (callMeWhenDataSyncArrayDone, 2, index, info1));

This callback is executed at schedule priority, after good status has returned from the other controller. The release callback function is optional, and to specify no callback use the callback structure (NULL, 0).

sharedMemRelease (mySharedMem, (NULL, 0));

sharedMemRelease (mySharedArray[index], (NULL, 0));

If the programmer is sure that no changes have been made to the structure, the lock may be released with sharedMemReleaseNoChange as shown below.

sharedMemReleaseNoChange (mySharedMem);

sharedMemReleaseNoChange (mySharedArray[index]);

This call does not copy the data or send it to the partner controller, so it is quicker and should be used when possible. There is no option for a callback when releasing a lock with no changes.

When developing features that share work between controllers, it is often necessary to start an operation on the other controller after some shared data has been updated. This could be done using the delayCallPartner interface. However, the function called would need to request the lock on the shared data before anything in the shared structure could be analyzed. Not only would this add overhead to send the call function, but also adds overhead to acquire the lock on the partner. To solve these problems and simplify feature implementation, a notification option is included as shown below.

```
sharedMemReleaseNotify (mySharedMem,
    (callMeWhenNotifyDone, 2, p1, p2),
    (callMeOnPartner, 3, pp1, pp2, pp3));
sharedMemReleaseNotify (mySharedArray[index],
    (callMeWhenNotifyArrayDone, 1, index),
    (callMeOnPartnerArray, 1, index));
```

This allows the user to optionally specify a notification function when releasing an exclusive write lock. The release call sharedMemReleaseNotify will execute the provided notification function on the other controller before the lock is released. When executed, the notification function has read only permissions to the shared structure as the other controller still has possession of the exclusive write lock. In this example, callMeOnPartner is called on the other controller with parameters pp1, pp2 and pp3, then the lock is released and callMeWhenNotifyDone is called on the releasing controller.

Moreover, this feature sends the provided notification function and all of its parameters to the other controller in the same DMA transfer as the shared structure. Then, before the lock is released and the release callback function is executed, a controller to controller interrupt is sent to the other controller. When the interrupt is received, the receiving controller will copy the shared data from the DMA buffer to the user's structure, and then call the provided function. This all occurs at interrupt priority while processing the controller to controller interrupt. When the user's function completes, good status is returned to the controller releasing the lock. Then at schedule priority, the releasing controller will release the lock and finally call the release callback function.

When using this feature it is important to remember that the structure copy is performed and the notification function is executed at interrupt priority. Obviously very large structures will incur unacceptable overhead when copied with the processor from non-cacheable DMA space to cacheable space at interrupt priority. Furthermore, the user's notification function cannot perform many tasks that can only be performed at scheduler priority, like allocating drive commands. The users function should be short, performing at most a few simple checks and then if necessary requesting the lock and possibly starting a processes to perform more work.

Thus, the notification function limitations include:

Can only use notification function when releasing a write lock.

Entire structure copied at interrupt priority.

User's notification function executed at interrupt priority.

User's notification function has read only access to shared structure.

One of the main challenges when developing a feature that shares work and information between controllers is error recovery. When a controller fails, work not finished by the failing controller must be finished on the surviving controller. When a replacement controller is inserted, work in progress and information on the surviving controller must be transitioned to the replacement controller.

When using emulated shared memory and a failover or failback occurs, there are no changes in the lock use rules. All threads must acquire the appropriate locks to access the shared data, even when failed over, even when the programmer knows from some other means that the data may be valid. When a failover occurs, all partner locks are cleared, permissions are granted to this controller, and pending requests are granted the lock. Lock transitions during failover are discussed in greater detail herein below. Furthermore, after a failover the shared data is guaranteed to be coherent, even if the failing controller was in the middle of updating it when the failover occurred. During a failback, before the replacement controller can get a lock to access the shared structure, the data on the replacement controller is restored.

To further facilitate implementing features that share work between controllers, two special notification functions are provided. There is a failover notification function and a failback notification function as shown below.

```
sharedMemSetFailback(mySharedMem,
    (callMeOnReplacement, 0));
sharedMemSetFailback(mySharedArray[index],
    (callMeOnReplacement, 1, index));
sharedMemSetFailover(mySharedMem,
    (callMeOnSurvivor, 0));
sharedMemSetFailover(mySharedArray[index],
    (callMeOnSurvivor, 1, index));
```

Like lock release notification functions, these functions are called at interrupt priority and have only read permissions to the shared data. Unlike lock release notification functions, these functions are set up at initialization time, and usually not changed. The emulated shared structure initialization function must be called before these functions are set up. These functions are optional, and are set up with separate interfaces, sharedMemSetFailback and sharedMemSetFailover.

The failback notification function is executed on the replacement controller before any threads on the replacement can get access to the shared structure. The shared structure is updated before the failback notification function executes to allow for shared structure read access during the function. This function is useful for setting up fast path arrays that are synchronized with the shared structure but not part of it.

The failover notification function is executed on the survivor controller as soon as possible after the other controller failure is detected. This function's execution must wait for any current users of the lock on the survivor to finish in order for the state of the shared structure to be coherent. This function is useful for taking over work that the failing controller was processing.

Though overhead is kept to a minimum, the benefits of this feature do incur moderate overhead. Every time the shared structure is modified, the entire structure must be copied to the other controller. Controller to controller data copies are expensive since they must be performed over the back end Fibre Channel connections. In addition, before the data can be sent to the other controller, it must first be copied to a buffer. This memory copy can be expensive if the shared structure is large. Making the shared structure smaller would help reduce these overheads. However, a feature implemented with smaller structures may incur more overhead due to more lock requests. So any feature must be analyzed carefully to determine the best design point in size of structures verses number of structures.

FIG. 4 is a table 400 showing the number of messages incurred per a lock request for the given lock request pattern. The percentage permissions available 410 is the percentage of the time that when the lock is requested the controller already has the permissions to grant the request. Half of a message 412 means half the time the messages need to be sent.

From FIG. 4 it should be apparent that the best performance 420 comes when both controllers only read the shared data or if only one controller writes the data and the other controller does not access it. In these cases, no lock messages 430 are required at all, only the synchronization of the data is required, for failover reasons. The worst performance 450 comes when both controllers are using the lock and they are synchronized so that the permissions continually move back and forth. This overhead goes down significantly if even half the time requests find the needed permissions on the controller. Notification functions add a single message of overhead along with interrupt level coping of the structure and notification function execution.

The use of read locks may provide some additional performance benefits, since both controllers and multiple threads on a single controller can read a structure at the same time. If a feature needs to read a structure often and not update the structure, then read locks should be used. However, if it is not practical to get a read lock and check the structure when half the time you decide that something needs to be changed. This would require releasing the read lock and requesting the write lock. Any checks made when the read lock is held would need to be performed again since the structure may have changed between the lock allocations. This may also result in twice as many controller to controller messages, since the read lock must be requested and released, then the write lock requested.

For each emulated shared structure, a significant amount of management information must be maintained. In order to make this feature easy to use, this information is hidden from the user.

When a user creates a shared structure, a second structure is created at the same time that contains all of the management information for the shared structure. The existence of this second structure is hidden from the user. This structure has two parts, a standard portion that is identical for all emulated shared structures and a variable size data buffer portion. For example, the hidden structure may follow with a short description of each field as shown below.

```
struct sharedMemType__mySharedMem
{
    struct semaphoreType   lock;
    struct sharedMemFlag   flags;
    char                   *name;
    struct delayCallInfo   notifyFailover;
    struct delayCallInfo   notifyFailback;
    void                   *userCopy;
    unsigned long          userCopySequenceNumber;
    unsigned long          dataSize;
    unsigned long          *bufferA;
    unsigned long          *bufferB;
    volatile unsigned long data
[SHARED_MEM_DATA_WORDS(sizeof(structmySharedType))];
};
```

This structure is created with the declaration sharedMemExtern or sharedArrayExtern, while storage is allocated with the declaration sharedMem or sharedArray.

The lock is the binary duplex semaphore for this shared structure. This structure contains all the information to maintain the lock. The flags hold state information about the shared memory. Only one flag needs to be set, for example, the only flag set may be used to indicate that failover processing has been done and failback processing has not yet been done. In general, an attempt to stay away from flags has been made. The name is a pointer to a string with the name of the emulated shared structure for debug purposes only. For this example, it would point to the string "mySharedMem". NotifyFailover is the structure that holds the information for the function to call when a failover occurs. NotifyFailback is the structure that holds the information for the function to call when a failback occurs. UserCopy is a pointer to the users structure, in the example shown herein. UserCopy points to &mySharedMem, or &mySharedArray[index]. UserCopySequenceNumber is the sequence number of the data in the users buffer, used to reduce the number of copies of data from the users structure to the hidden buffer. Sequence numbers are defined in further detail herein below. DataSize is the size of the users shared structure, e.g., sizeof(mySharedType) in the example described herein. BufferA is a pointer into the data region set aside for one of the dual hidden buffers. BufferB is a pointer into the data region set aside for one of the dual hidden buffers. Data is a buffer used for DMA of the users data. Special care is taken to allow DMA from this area on controllers with processor data cache enabled.

In the example discussed above, the structure type for the hidden structure is struct sharedMemType__mySharedMem. This type name is derived from the user provided name, mySharedMem. Likewise, the name of the hidden buffer is sharedMem__mySharedMem. The reason for the name of the hidden structure to be derived from the shared structure's name is to allow for compile time binding. This means that at compile time, when the shared structure is used the location of the hidden structure is known. This precludes the need to search for the hidden buffer at run time. The limitation of this is that the actual name of the shared structure must be used when requesting and releasing the shared structure. Pointers to the shared structure cannot be used to perform operations. This may seem like a limitation, except that the type of lock being requested is known since the operation being performed is specific to a particular shared structure. So practically, it does not limit the types of things that are typically done with shared information.

The macros for creating the shared structure and hidden structure external declarations are sharedMemStructure and sharedMemExtern. Note that sharedMemExtern also creates the extern for the user's shared structure. The array versions of these macros are similar.

The macros to perform operations on the shared structure all use the same macro to perform the compile time binding. This macro is used for both array and scalar shared structures.

All of the request and release macros are similar. The request macro is used to request write permissions on the shared structure. When they are granted, the callback function will be executed. The release with notification macro call is similar, but with two functions provided, the release callback function and the notification function.

The data section of the hidden structure is referred to as the dual hidden buffer. This buffer is large enough to hold two copies of the user's shared structure with embedded checksums, notification function call information, and sequence numbers. The map of a hidden buffer, or half of a dual hidden buffer 500 is shown in FIG. 5.

Both halves of the dual hidden buffer have an identical layout. In the present example, N is the number of bytes and it is larger than 1024. Note, that the sequence number 520 is the last work of the buffer. The embedded checksums 530–534 over the user's data 540–544 are used to verify the data was transferred from the other controller without error and provide protection from memory corruption. In the prior art, no protection is provided for controller to controller data corruption. The notification section 550 is used to transfer the notification function between the controllers when provided during lock release. It is transferred with the user data to reduce the controller to controller overhead. The sequence number 520 is the last word in the buffer and the last word transferred. When the sequence number is valid in memory on the partner controller, then the entire buffer is known to be valid.

FIG. 6 shows two hidden buffers 600. When one copy 610 is being overwritten by a DMA operation, the other copy 612 is valid and coherent. When using the buffers, the shared memory mechanism switches between the two buffers 600, always overwriting the buffer with the older data. The current buffer is determined by the sequence number, as the larger sequence number identifies the buffer with the newest data. If a DMA is in progress, due to releasing a write lock, and the releasing controller fails before all of the data is written, the sequence number will not have been updated. Then when the surviving controller gets the lock, it will find the sequence number on the other buffer, the one not being written into by the partner, as the most current. Since the shared structure lock is not released until the data transfer is finished, it will appear as the operation never occurred.

When a lock is granted, the data from the most current hidden buffer 600 is copied to the users shared structure. If the user's data in the shared structure is already current, then no copy is performed. This is determined by checking the userCopySequenceNumber variable. This value is set when the users buffer 600 is updated. After the user makes changes to the shared structure, the data is copied from the shared structure into the hidden buffer 600 with the older data. The user's sequence number (see 520 in FIG. 5) is incremented and written to this buffer 600. This buffer 600 is then transferred to the other controller. After the transfer is complete and the notification call is also complete if provided, then the lock is released. It should be noted that the user's shared structure is not automatically updated when the partner controller makes changes. The changes are transferred to the controller and stored in the hidden buffers 600, but the user's shared structure is only updated when needed. The user's shared structure may be very down level from the hidden buffer 600, but as soon as a lock is granted, it is brought up to date with the most current information.

Access to the two hidden buffers 600 is performed with two pointers, bufferA and bufferB. These pointers are needed since the data in the dual hidden buffer 600 is used for DMA and must be cache line aligned. When the processor cache is enabled, it will bring entire cache lines into its cache when any word in the line is accessed. If the hidden buffers 600 cross into a cache line that is being brought into cache, then part of the hidden buffer will also be brought into cache. Then, when a DMA from the other controller writes to the hidden buffer, stale data is in cache. When it gets flushed, data corruption results. This problem is solved without having the user do additional work to locate the dual hidden buffer in DMA space. The area reserved for the two dual buffers 600 is rounded up to a cache line 630, and then padded out the size of a cache line minus one word 640. Then the pointer bufferA is initialized to point to the first cache line aligned address in the dual hidden buffer. Pointer bufferB is initialized to the next address after the first hidden buffer. Both pointers have the non-data cacheable address bit set.

The combined size of Buffer A 610 and Buffer B 612 is rounded up to a cache line. Then, an additional cache line is added. Next, Buffer A 610 and Buffer B 612 are located so that Buffer A 610 is cache line aligned.

In an effort to help users of emulated shared memory use the locks correctly debug features can be provided. If the structures are used correctly, then the incidence of difficult to debug shared memory corruption problems will be reduced. These checks are only executed when asserts are enabled.

There are two basic things that are done to help force correct use of the locks. The user's structure is checked at various times to make sure it has not been modified without a write lock held. When a user releases a read lock or a write lock with no changes, the structure is checked against the hidden buffer. This is done by calculating the checksums over the user's structure, then comparing them against the checksums in the hidden buffer. Only the checksum's are compared in an effort to improve the check's performance. This check is also made after a notification function is called. In addition, this same check is performed when a lock is granted and the user's structure already contains the most current data. These checks will catch some lock rule violations, but may not catch them all. For example, if one thread has a write lock and another thread updates the structure, the check does not know the wrong thread performed the update.

In an effort to protect against read lock violations, the user's structure is overwritten with invalid or "garbage" data when no lock is held. Reading a shared structure without a read or write lock is prohibited since the structure possibly contains stale data. Most of the time, stale data may not cause any problems. However, these results are unpredictable. The few cases that do cause problems may go undetected. Thus the user is warned that they are reading a shared structure without a lock. This warning may be repeated, and may start at any place in the string. Accordingly, data communicates to the user what the problem is and at the same time is random enough that each time it is copied to the user's structure different values may be copied in. The sequence number of the user's copy is also adjusted, forcing data to be read from the hidden buffer the next time the lock is acquired. This string is not copied to the user's structure each time it is released. If a read lock is released or a lock is released with no changes, then the string is not copied. Every fourth time (controller wide, not per a lock) a write lock is released with changes the string is copied. The sting is not always copied due to needing test time for detection of write lock violations that require the user's buffer be valid and up to date.

To ensure proper operation, certain restrictions and limitations must be followed. These restrictions and limitations include at least one of the following:

Lock rules given in section 2.2 must be followed.

Notification rules given in section 2.3 must be followed.

Microsoft Visual Studio does not recognize functions when they are used as parameters with (void *) in fount.

Use of dynamic memory. An attempt is made to use memory efficiently by only allocating the amount that is necessary for short periods of time. However, dynamic memory schemes are always subject to fragmentation.

Fixed max number of arguments, today 10. The maximum number of arguments is needed to set size limits on structures and limit the amount of data moved when a function is being set up to be called.

Arguments must be 32 bit values. This assumption is necessary so that a prototype for the function can be reconstructed by only knowing the number arguments that the function takes.

There is no type checking on the function prototype and number of parameters. If a function prototype is changed to add a parameter, if the delay call parameter list is not also changed, then random garbage will be passed to the function for the last argument.

To limit the access to user defined resource in order to maintain data integrity, a duplex binary semaphore is used. The duplex binary semaphore is a replacement for the "dual-controller lock process" code. The new mechanism provides read locks, in which multiple threads can have read access to the lock at the same time, in addition to exclusive write locks. The callback functions use the delay call format and may have, for example, ten arguments. Thus, the interprocessor overhead and processing overhead are greatly reduced. This mechanism is really a locking mechanism or a binary semaphore, not a true counting semaphore.

Moreover, the duplex binary semaphore scheme allows firmware engineers to implement any number of other features. There is no specific feature that this has been implemented for. The user interface defines functions for initializing, requesting, releasing and displaying the semaphore. The prototypes are:

extern void semaphoreInit(struct semaphoreType *semaphore);

extern unsigned long semaphoreRequest(struct semaphoreType *semaphore, unsigned long reqType, void *callback, unsigned long numberOfArguments, . . . );

extern void semaphoreRelease(struct semaphoreType *semaphore);

extern void semaphoreDisplay(struct semaphoreType *semaphore);

extern void semaphoreDisplayAll(void);

The initialization function must be called only once on each controller, and it should be called before the controller has a chance to failover. During the initialize routine, the semaphore is added to a list of all semaphores in the system. This list is then used during the failover process. An example of initialization is as follows:

struct semaphoreType mysemaphore;
semaphoreInit(&mySemaphore);

The semaphore request function will queue a request for the semaphore. Semaphores are granted in the order they where requested. A semaphore may not be requested until after it has been initialized and after the scheduler has been initialized. When the semaphore becomes available, the callback function given in the request is executed at scheduler priority. At that point the semaphore is locked to the requesting thread. At boot time a lock will not be granted until controller to controller messages have been established. During a failback, the replacement may not be granted a lock until NEXUS is established, while the survivor has continued access to the lock. The reqType of a request is either SEMAPHORE_TYPE_WRITE or SEMAPHORE_TYPE_READ, corresponding to needed exclusive write access or non-exclusive read access.

```
if (semaphoreRequest(&mySemaphore,
        SEMAPHORE_TYPE_WRITE,
        CallMeWhenAccessIsGranted, 5, param1, param2,
        param3, param4, paramS) == FALSE)
{
    /* no resources, try again later */
    ...;
}
```

When the requesting thread finishes using the shared resource, then it must release the semaphore. This does not need to be done during the callback function. It may be after some process has finished, etc. When the semaphore is released, it will be granted to the next thread that is queued, possibly on the other controller of a duplex pair.

semaphoreRelease(&mySemaphore);

For debug purposes, the contents of semaphores may be displayed singularly or all at once.

semaphoreDisplay(&mySemaphore);
semaphoreDisplayAll( );

When designing code, data that must be shared between the two controllers or between multiple "threads" on the same controller may be placed under the control of a semaphore. This simply means the rules must be followed for locking the data. As mentioned earlier, there are read and write locks. When a user is granted a read lock, the user can only read data that is under control of the semaphore. If the data is read without a lock, there is no guarantee that the data will be coherent as other threads may be updating it at the same time. When a user is granted a write lock, then no other user can read or write the data that is under control of the semaphore. If data is written without a write lock, data corruption may result as two threads may be updating the structure at the same time, in which case one of the threads updates may be lost. The shared data may be read with either a write lock (also called an exclusive lock) or a read lock. Shared data may only be written when a write lock is held. To summarize;

All accesses to shared data should be made while the corresponding lock is held, To read the data, a read lock or a write lock must be held, To change the data, a write lock must be held.

Figure 7:
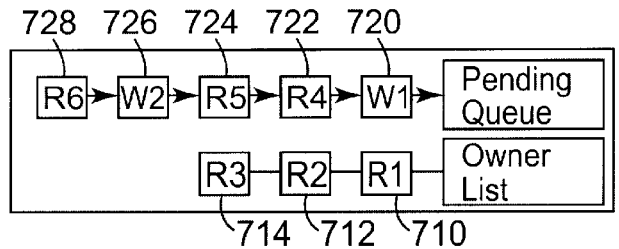
FIG. 7 shows queued requests for processing using the emulated shared memory according to the present invention.

When a read lock is granted, any additional read lock requests will be granted. When a write lock is granted, all other lock requests will queue up and wait until they are granted the semaphore. If a write request is made while a read lock is granted, the write lock will wait for all current reads to release the lock. Any read requests made after a write lock is queued will not be given access. For example, FIG. 7 shows these requests in this order (read1 made 1$^{st}$,) read1 710, read2 712, read3 714, write1 720, read4 722, read5 724, write2 726, and read6 728.

Figure 8:
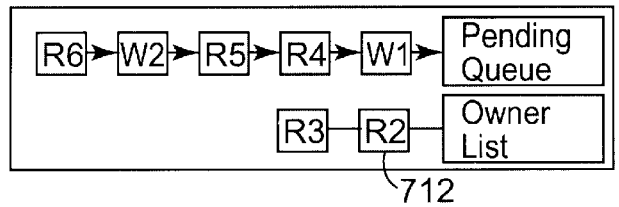
FIG. 8 shows that a first read request has been released.
Figure 9:
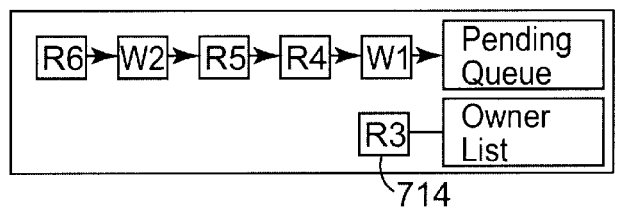
FIG. 9 shows that a second read request has been released.
Figure 10:
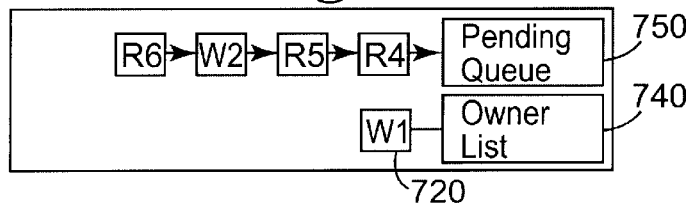
FIG. 10 shows that the third read request has been released.
Figure 11:
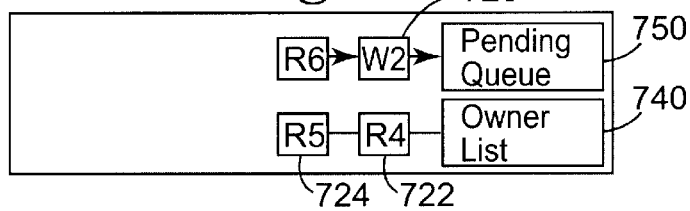
FIG. 11 shows a first write finished and how a fourth and fifth read request will be granted.

Because the lock was idle when read1 710 arrived, it is granted the lock immediately. In FIG. 8, read1 710 has been released. In FIG. 9, read2 712 has been released and read3 is queued. In FIG. 10, read3 714 has been released. As no more requests are on the owner's list 740, the next pending request is granted the lock. In this case write1 720. Because writes are exclusive, no more pending requests are examined. In FIG. 11, once write1 720 finishes, read4 722 and read5 724 will be granted access. Only one write may ever be on the owner's list at a time. Thus, the next request is granted the lock. Because that request is a read, i.e., read4 722, the next request is also examined. Because that is a read, i.e., read5 724, it is also granted the lock. Because the next request is not a read, i.e., write2 726, it will stay on the pending list 750.

Figure 12:
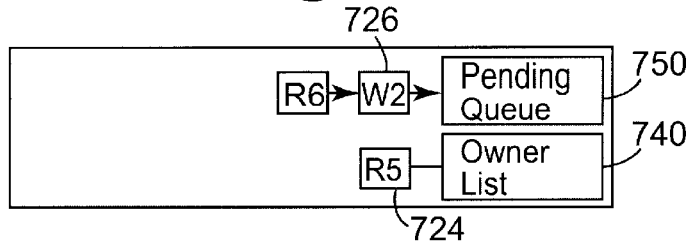
FIG. 12 shows that the fourth read request has been released.
Figure 13:
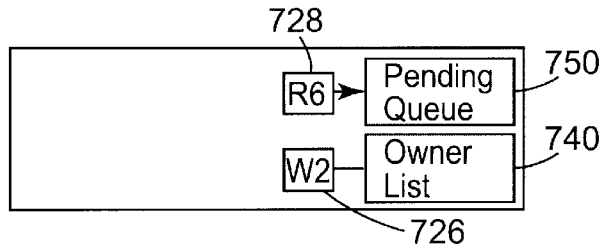
FIG. 13 that the fifth read has been released and that the second write will be granted access.
Figure 14:
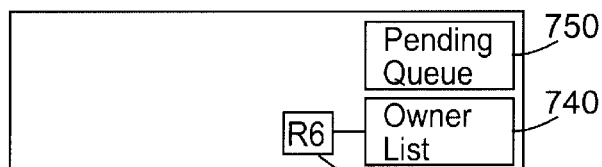
FIG. 14 shows that when the second write finishes a sixth read will then only be granted access.

FIG. 12 and FIG. 13 show that when both read4 722 and read5 724 finish respectively, write2 726 will be granted access. Because the next request is a write, i.e., write2 726, no more pending entries are examined. FIG. 14 shows that when write2 726 finishes, read6 728 will finally be granted access.

In order to keep message passing between controllers to a minimum while obtaining and releasing locks, a mechanism of permissions is used. For example, there may be two permission flags on each controller, along with a tie break flag. There may be a read permission flag and a write permission flag. Permissions are not locks. Permissions mean that the controller with them has permission to grant locks of that type. There may be no locks held on a controller, but the controller may have permission to grant a lock when one is requested.

During normal operations, each controller may have no permissions, read only permissions, or read and write permissions. When a lock is requested, if the controller has the corresponding permissions when the lock is available, it may grant the lock without sending any messages to the other controller. If the needed permissions are not available, then a request for those permissions is sent to the other controller. When looking at the two controllers during normal operations in steady state, there are only two states that the lock permissions may be in. Either both controllers have read permissions, or one controller has read and write permissions and the other controller has no permissions.

Figure 15:
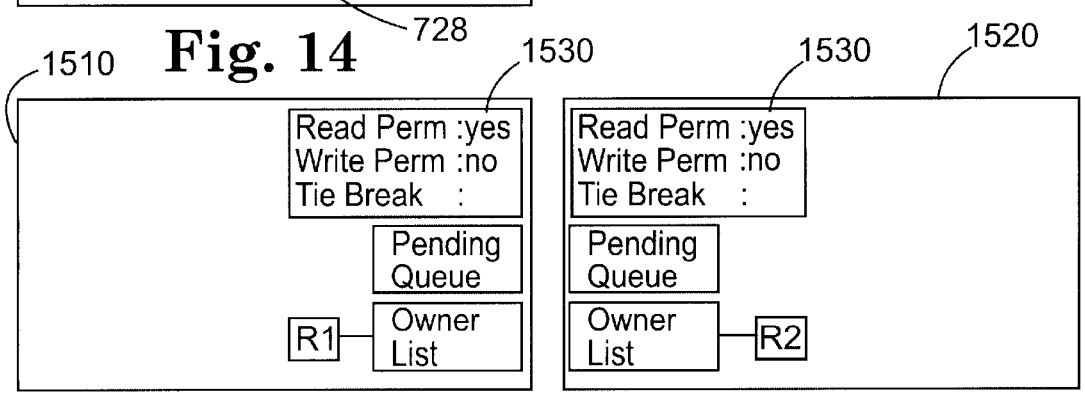
FIG. 15 is a block diagram showing two controllers having read permissions.

FIG. 15 is a block diagram 1500 showing two controllers 1510, 1520 having read permissions. Because both controllers 1510, 1520 have read permissions 1530, neither have write permissions. Both controllers 1510, 1520 may service read requests at the same time.

Figure 16:
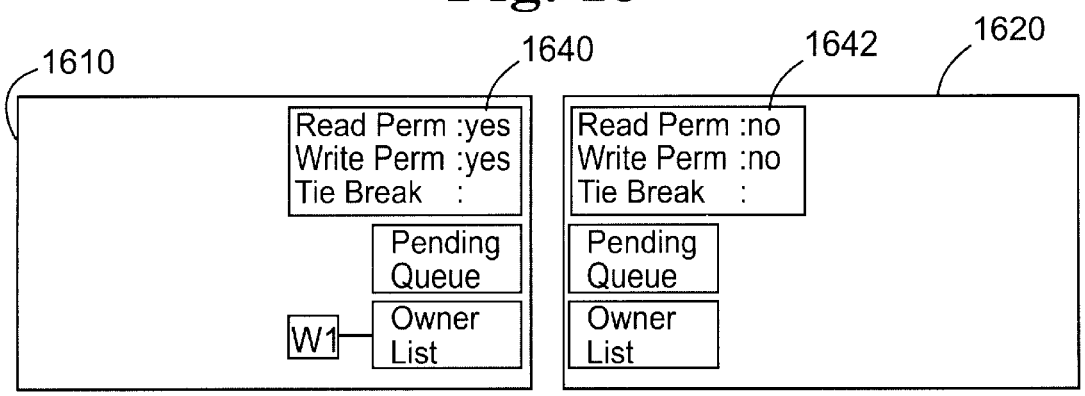
FIG. 16 is a block diagram showing two controllers, wherein one has write and read permissions and the other has no permissions.

FIG. 16 is a block diagram 1600 showing two controllers 1610, 1620, wherein one has write and read permissions 1640 and the other has no permissions 1642. In FIG. 16, only one controller 1610 may have write permission at a given time.

Figure 17:
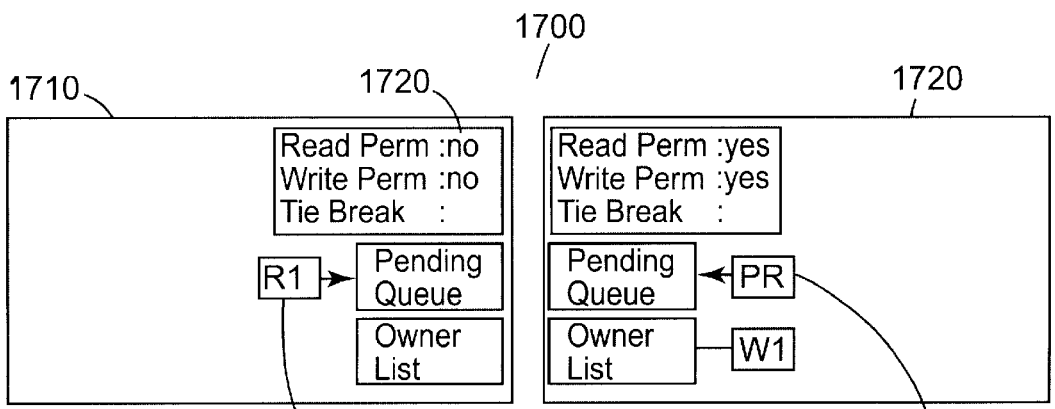
FIG. 17 is a block diagram showing two controllers wherein a read request is made on one controller when read permissions were not available on the controller.

FIG. 17 is a block diagram 1700 showing two controllers 1710, 1720 wherein a read request 1750 is made on one controller 1710 when read permissions were not available 1720 on the controller. This causes a message to be sent to the other controller requesting permissions 1744. The request, PR (i.e., partnerread) 1744 is queued up depending on write1 1746 finishing. When write1 1746 finishes, PR 1744 will clear write permissions and send read permissions back to the first controller 1710 for read1 1750. When a request for permissions is received, a lock request is queued for the semaphore like any user request. When the request gets access to the lock, then permissions are cleared from the receiving controller and sent to the requesting controller. When a read lock is requested, the write permissions on the other controller are cleared. When a write lock is requested, both write and read permissions are cleared on the other controller.

Figure 18:
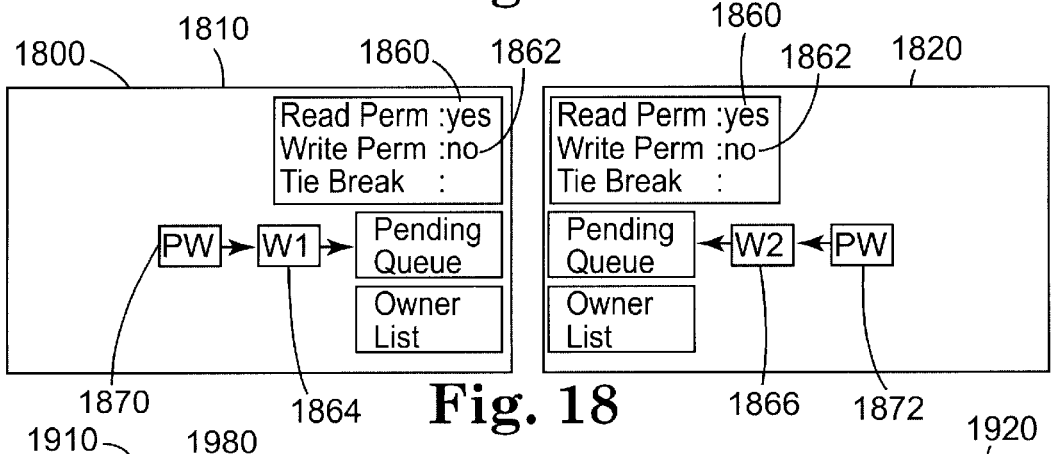
FIG. 18 is a block diagram showing deadlocked controllers.

FIG. 18 is a block diagram 1800 showing deadlocked controllers 1810, 1820. In FIG. 18, both controllers 1810, 1820 have read permissions 1860, and hence neither one has write permissions 1862. When write1 1864 and write2 1866 requests are made at the same time, both controllers 1810, 1820 send a message 1870, 1872 to the other one. This results in a partner request 1870, 1872 for the other controller being queued. Both partner requests 1870, 1872 are waiting for the other controllers write to finish, but it never will due to both controllers writes waiting for the their partner requests to finish.

Figure 19:
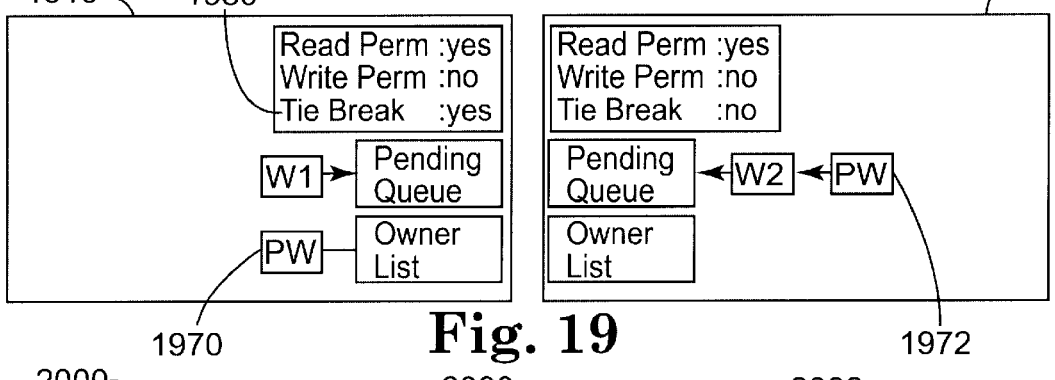
FIG. 19 shows the tie breaking wherein the tie break bit is set and the request from the partner is placed at the head of the queue on that controller.

This is where the tie break flag comes in. When a controller is granted write permissions, the tie break flag is set. When a controller clears read permissions, meaning the partner has requested write permissions, then the tie break bit will be cleared. Only one controller will ever have the tie break bit set. This controller is the last controller to have had exclusive use of the lock. The deadlock situation may only occur if both controllers have read permissions and a write request is received from the other controller. FIG. 19 shows this situation wherein the tie break bit is set 1980 and the request 1970 from the partner is placed at the head of the queue on that controller 1910. This prevents the deadlock as the last controller to have had exclusive use must then wait for the other controller to finish using the lock. When PW 1972 comes in, the controller 1910 sees the tie break flag set 1980 and thus instead of queuing the request 1970 at the tail of the pending list, it is queued at the head. From here it will be granted access even though this controller does not have write permissions.

Figure 20:
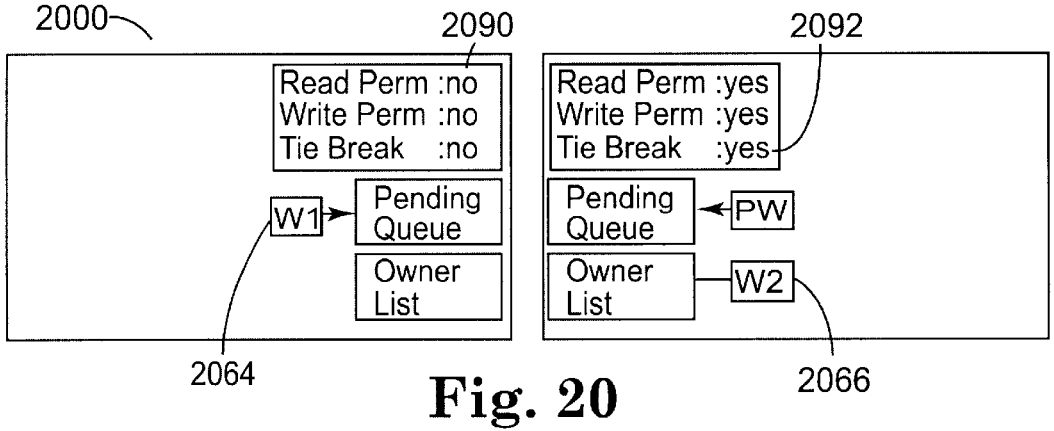
FIG. 20 is a block diagram showing the deadlock broken by the tie break flag.

FIG. 20 is a block diagram 2000 showing the deadlock broken by the tie break flag. The read permissions are cleared 2090, the tie break flag is toggled 2092, and write permissions are sent back for write2 2066. Once write2 2066 finishes, write1 2064 will execute.

When looking at the three flags on one controller during normal operations, there are only four states they may be in; no permissions or tie break, read permissions but no tie break, read permissions and tie break, or all three flags set. When looking at both controllers during normal operations and in steady state, there are still only two possible states; both controllers with read permissions and one controller with tie break flag set, or one controller with all three flags and the other controller with no flags. To detect and handle the deadlock situation above, when a write request is received a check is made to see if the write permissions are not held and the tie break bit is set. If in the case, the partner's request is queued at the head of the pending queue for the semaphore. This still generates optimum queue behavior, since the only request that may be at the head of the queue at this point is a write request, and that is the request we are breaking the deadlock with. If there is no write request at the head of the queue when the partners write request comes in, then the pending queue must be empty as any reads would have been granted access and removed from the pending queue.

Figure 21:
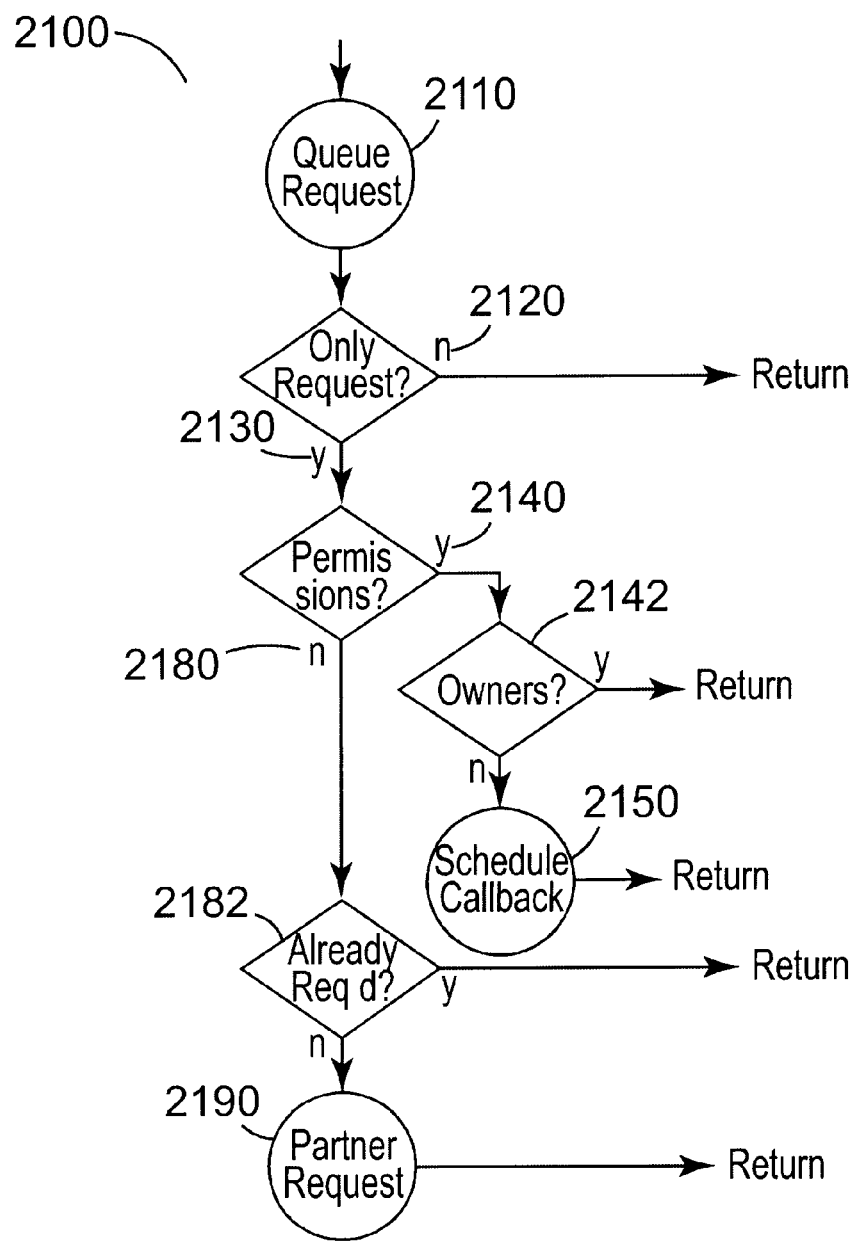
FIG. 21 illustrates a flow chart for lock requests.

To further explain the lock mechanism, lock requests as they flow though the mechanism are examined. FIG. 21 illustrates a flow chart 2100 for lock requests. When a lock request is made, it is always placed on the pending request queue first 2110. If it is not the only item on the pending queue 2120, then the request function returns to the caller. The fact that there are other requests on the pending queue is sufficient to know that no further processing can be done with the new request. If the new request is the only request on the pending queue 2130, then more processing is required. If the controller currently has the required permissions for the request 2140, then a check is made on the current owners 2142. If the request is for a write lock and there are no current owners, the request is granted and the callback function scheduled 2150. When granted, a request is removed from the pending queue and kept track of as an owner. If the request is for a read lock, and if the semaphore is idle or current owners are read owners, the request is granted and the callback function scheduled 2150. Otherwise, the request is returned. If the controller does not have the required permissions 2180 and the request is already required 2182, a request is sent to the partner requesting the permissions 2190. New requests stay on the pending queue.

Figure 22:
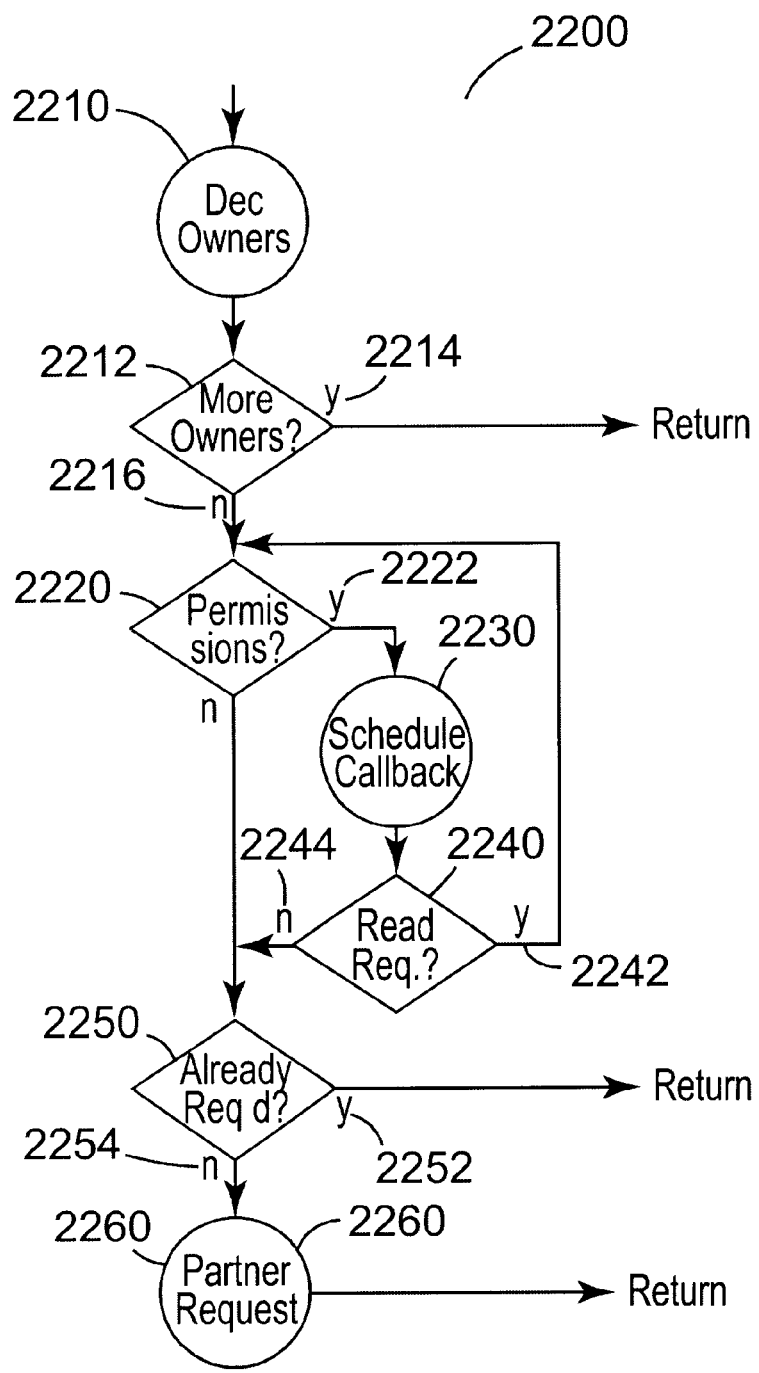
FIG. 22 illustrates a flow chart for lock release.

FIG. 22 illustrates a flow chart 2200 for lock release. When a lock is released, the pending queue must be checked to see if a request can be granted and its callback scheduled. After requests have been scheduled, a check is also made to see if any permission requests need to be sent to the partner. For example, read requests that are granted with read permissions only may cause a pending write request to become the new pending head. This causes a write permission request to be sent to the partner controller, even while the read requests are active on this controller.

Thus, for lock release the count of the current owner is decremented 2210. Next, a decision is made as to whether there are any current owners 2212. If there are 2214, then the request function returns to the caller. If not 2216, the processing continues. Next, a decision is made whether the controller has permissions for the pending head 2220. If yes 2222, then the callback is scheduled 2230. Then, a decision is made whether a read was just granted 2240. If yes 2342, permissions are examined. If a read was not just granted 2244, then a determination is made as to whether the permissions for new pending head has been requested 2250. This is also the step performed when the controller does not have permissions for the pending head. If permissions for a new pending head has been requested 2252, then return the request to the caller. If not 2254, request permissions from partner 2260. To transfer permissions to the other controller, the callback function may be a partner callback function. The partner callback function is a read type or a write type like all requests. A partner read request may own the lock along with any number of other read requests on one controller. A partner request will clear the appropriate permissions and send them back to the partner.

There is a slight distinction in the flow charts of FIGS. 21 and 22 for partner requests. Partner requests do not need to have the permissions they are requesting in order to execute. For example, a write permission partner request may execute when both controllers only have read permissions, as this is the only way write permissions are created. Partner callback functions release the lock as any other request.

Figure 23:
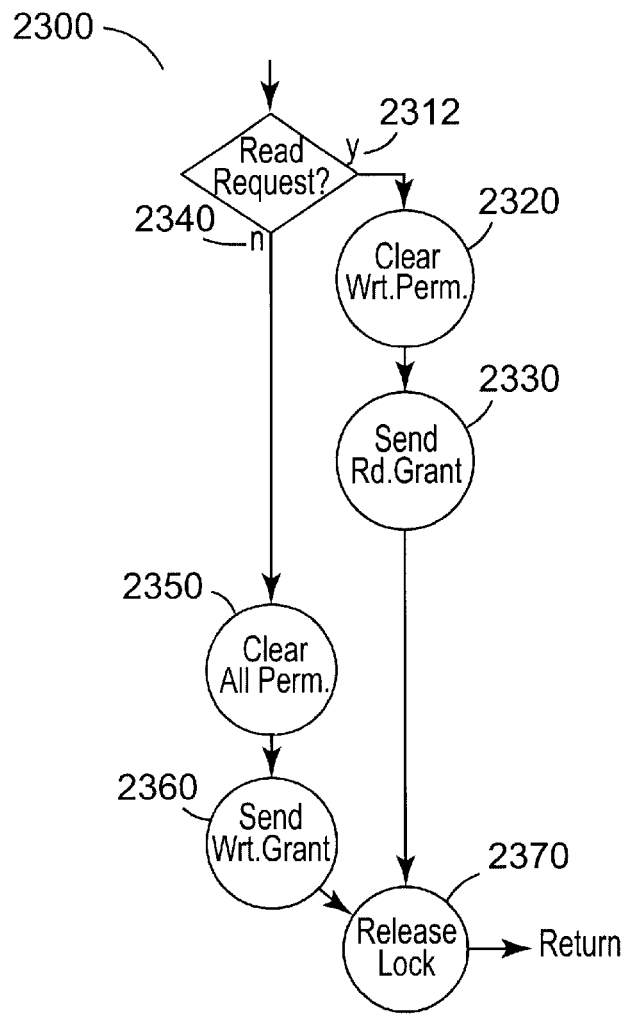
FIG. 23 illustrates a flow chart for partner lock request.

FIG. 23 illustrates a flow chart 2300 for partner lock request. If the request is a read request 2312, then the write permissions are cleared 2320. Since the controller is a read owner, other owners can only be reads. Hence, write permissions not needed by other current owners. Then, a read permission grant message is sent 2330.

If the request is not a read request 2340, then all permissions are cleared along with the tie break flag 2350. This is a write owner, and therefore is exclusive, i.e., no other owners to consider. Next, a write permission grant message is sent 2360. Then, the lock is released as illustrated in FIG. 22 2370.

When a controller boots with force simplex, it is automatically granted read and write permissions and the tie break flag. Since it has read an write permissions, it will never send any messages to its partner requesting them. This is the only check on force simplex necessary in throughout entire mechanism. When a controller boots without force simplex, neither controller will get any permissions, or the tie break flag. They must acquire the permissions by requesting them from the partner controller.

The first request for permissions is no different than any other request, and the partner controller can service a partner request when it does not have the requested permissions. As described in the previous section, the partner controller creates permissions for partner requests. Since if servicing a request, it knows the partner cannot have those permissions it is requesting, so it will generate them. In the above section, deadlock was described for the case when both controllers have read permissions and both request write permissions. Deadlock can also occur during initial setup when both controllers have no permissions, and both request read permissions, or one requests read and the other requests write permissions, since the tie break flag is not set.

Figure 24:
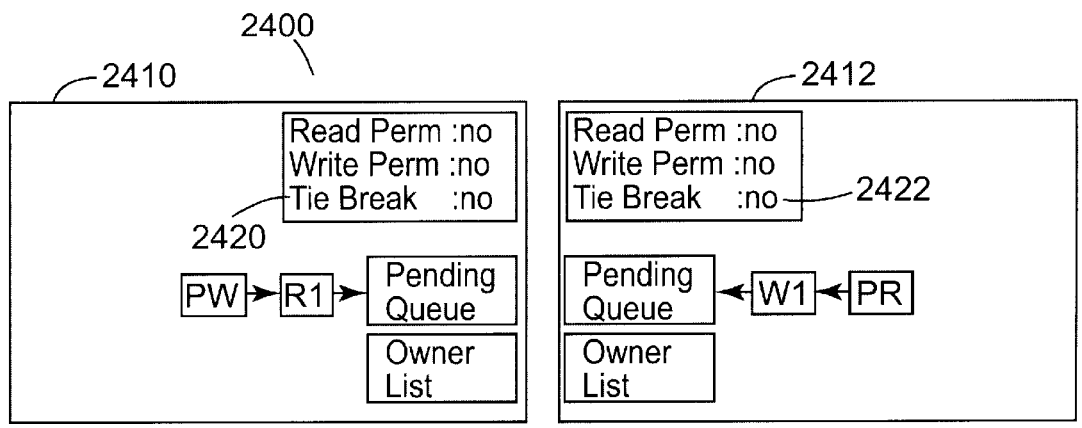
FIG. 24 illustrates a block diagram wherein deadlock occurs in two controllers at an initial state.

FIG. 24 illustrates a block diagram 2400 wherein deadlock occurs in two controllers 2410, 2412 at an initial state. Initial setup for duplex operation is difficult due to the tie break flag. The tie break flag may only be set on one controller, if it is ever set on both controllers at the same time data corruption will result. If it is not set on either controller, then deadlock will result. The flag cannot simply be set when a controller boots 2420, 2422, since it may boot as a replacement for a failed controller, in which case the other controller has the write lock and therefore also has the tie break bit.

Figure 25:
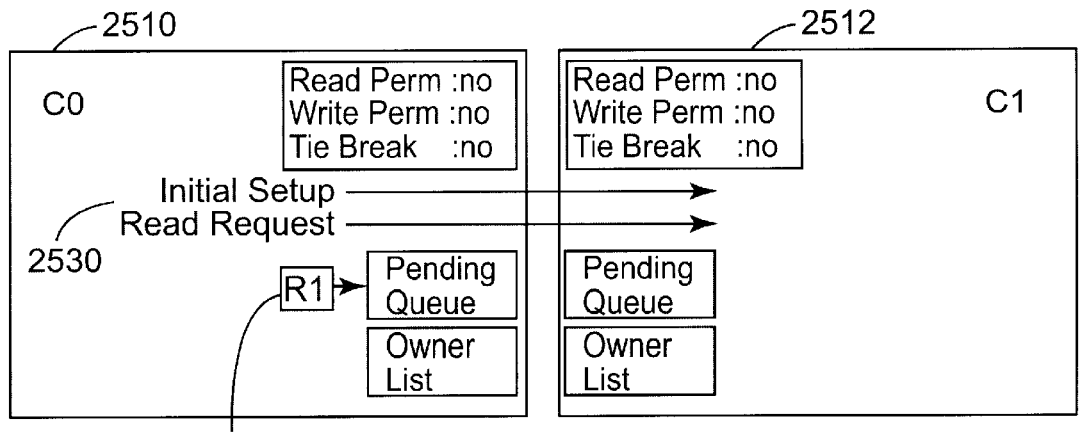
FIG. 25 is a block diagram showing two controllers and the operation of the initial setup messages.

To solve this problem a special message is used, i.e., the semaphore initial setup message. FIG. 25 is a block diagram 2500 showing two 2510, 2512 controllers and the operation of the initial setup messages 2530. The initial setup message is queued up for each semaphore when the semaphore is initialized at controller boot time. By queuing the message at this time, it guarantees that it will be the first message that is sent regarding the semaphore. The message is only sent once the semaphore has been requested by a user. It will not send this message until another message is queued. When another message is queued, the initial setup message is sent. When status is returned, then the next message is sent. The initial setup message 2530 from the first controller 2510 is sent due to request R1 2540 being made by a user. in this case, since the tie break is clear on the second controller, this message does nothing. This mechanism guarantees that before a controller can receive permissions from its partner, it will have its tie break flag set appropriately by receiving the initial request message.

Figure 26:
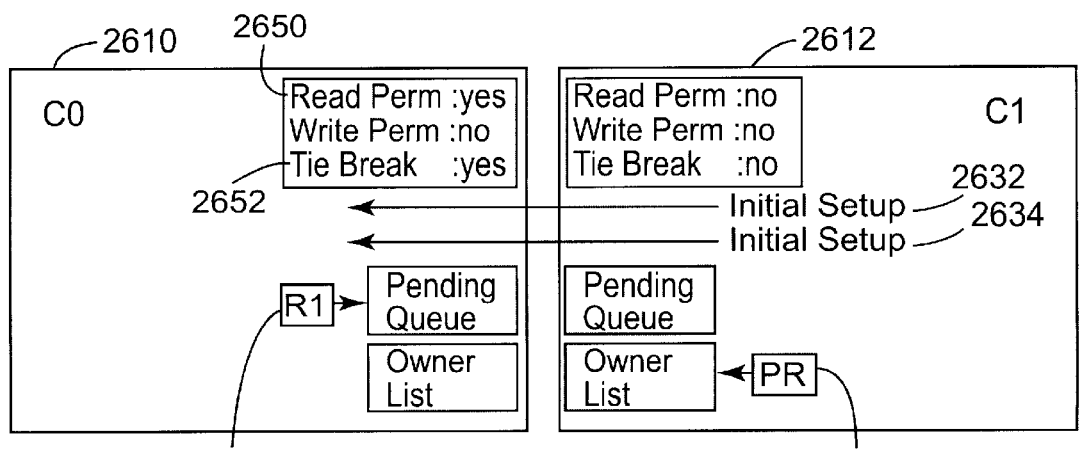
FIG. 26 is a block diagram illustrating the initial setup.

FIG. 26 is a block diagram 2600 illustrating the initial setup. When the partner read request 2642 is received, it is scheduled. This request clears write permissions from this controller, and then sends the read grant 2650. Since this is the first message that the second controller 2612 has sent regarding this semaphore, the initial setup message must be sent 2632. This causes the tie break bit to be set on the first controller 2652. Then the read grant is sent 2634.

The goal for failover and failback handling for semaphore locks is to make the occurrence invisible to the user. When a failover occurs, all semaphore locks on the surviving controller have read and write permissions granted and the tie break flag set. All pending messages to the partner are flushed at this time as well. Then if there are any pending requests on the survivor, checks are made to grant them the semaphore. Any semaphores that where held by threads on the survivor are not effected by the event. If a partner request was scheduled but had not yet run, then when it does run it will not clear any permissions or the tie break flag and it will not send a message back to the failing controller. It will simply release the lock, allowing other threads to have access to it. Since the surviving controller has both read and write permissions, the mechanism will not send a request for those permissions to its partner.

During failback, the replacement controller will not send any messages to the survivor regarding semaphores until after NEXUS is established. Requests for the semaphore may be made before this time, but the messages stall until NEXUS is reached. This is required to let mechanisms that use the semaphores to protect data synchronize there data prior to the replacement getting access. Therefore replacement controllers will not be granted the semaphore until after NEXUS is established. The survivor will have continued access to the semaphore.

Once NEXUS is reached, the stalled messages on the replacement are sent to the survivor. The survivor will not have any messages for the replacement since it has all the permissions. The first message sent will be the initial setup message, just like at boot time. When this message is received by the survivor, it will clear its tie break flag if and only if it is the second controller. Regardless of which controller it is, the survivor will always send a new initial setup message back to the replacement in response to its initial setup message. This again guarantees that on each controller, it will have the initial setup message from its partner set its tie break flag to the appropriate value before a request for permissions is received. When both the initial setup messages finish, the first controller will have the tie break flag set, and the second controller will not.

A "delayed procedure call" is a function call that is setup to be performed later at a lower priority. Adding support for delayed procedure calls allows firmware engineers to develop better firmware quicker. The firmware is easier to develop because the feature can be used without having to create another mechanism when the need arises. The firmware is better since when new features or architecture changes require changes to such mechanisms, only one common module should need to be updated. The delayed procedure mechanism discussed here has three parts:

user interface, time delay scheduling, and duplex controller execution.

This new feature is a tool that may be used by firmware engineers to implement any number of other features. There is no specific feature that this has been implemented for. The user interface defines a standard argument list for specifying delay call functions. By having a standard interface it is easier to recognize when a delay call function is being used. The standard argument list for specifying delay call functions consists of a function pointer, followed by the number of arguments, followed by a variable list of arguments. The prototype for the basic delay call function is:

Boolean delayCall(void *function, U32 numberOfArguments, . . . );

This function returns TRUE if the function was successfully scheduled to run. FALSE is returned if the function was not scheduled, due to lack of dynamic resources. The function type is a void pointer. This is necessary since the function that is to be called can have any number of arguments, up to a fixed limit (initially set to ten.) The return type of the function may also vary, though there is no way to get the returned value. The number of arguments is the number of un-named arguments that follow in the parameter list. The un-named arguments are the arguments for the function to be called, and all should be thirty two bit values. Examples of use are:

delayCall(myFunction, 0);

delayCall(myOtherFunction, 1, argument1);

delayCall(myOtherOtherFunction, 4, argument1, argument2, arguement3, argument4);

All arguments are evaluated at the time delayCall is executed, not at the time the delayed function is called. In the following example, myFunction gets passed one argument:

i=0;

delayCall(myFunction, 1, i);

i++;

The value passed to myFunction is 0. The i++ statement is executed before myFunction is executed, however i was evaluated for the call to delayCall before the i++ statement is executed.

At times it may be important to execute a function after a delay. An additional interface is provided to do this. Before the standard delay function call parameter list a wait time is provided with the number of milliseconds to wait before executing the given function. The accuracy of the delay is dependent on the accuracy of standard delays provided by the schedule mechanism. The granularity may be chosen, e.g., 25 msec granularity. The prototype for this function is:

Boolean delayCallTime(U32 waitTime, void *function, U32 numberOfArguments, . . . );

The function returns TRUE if the function was successfully scheduled to run. FALSE is returned if the function was not scheduled, due to lack of dynamic resources.

The most powerful aspect of the delay call feature is the ability to execute functions on other controllers. The function is specified in the standard manner. It is then sent to the other controller of a duplex pair along with all provided arguments. The other controller then executes the function at schedule priority. The prototype for this function is:

Boolean delayCallPartner(void *function, U32 numberOfArguments, . . . );

The function returns TRUE if the function was successfully scheduled to send to our partner. FALSE is returned if the function was not scheduled to send, due to lack of dynamic resources. if resources cannot be allocated when the function to execute is received, then it will abort.

The delay call feature uses a standard storage form for delay call functions. These structures are only for internal use by the delay call mechanism. They must be exported due to exported macros that are part of the mechanism that use the structures. The structures are:

```
/*
** Private structures. Do not use these outside of the delayCall
module.
** They are here for use by exported macros.
*/
struct delayCallFlags
{
    unsigned int internal_allocation:1;
    unsigned int :23;
    unsigned char numberOfArguments;
};
/*
** The arguments MUST be last in this structure. When space
is dynamically
** allocated, only enough for the arguments that are used is
allocated.
*/
struct delayCallInfo
{
    struct delayCallFlags control;
    void *function;
    U32 arguments[DELAY_CALL_MAX_ARGUMENTS]; /*
MUST BE LAST */
};
```

The internal allocation bit is used to specify if the delay call mechanism should de-allocate the memory used to store the delay call information. The function pointer and number of arguments are set from the user provided values in the standard argument list. The argument list must always be last in this structure, since when memory is dynamically allocated, only enough for the parameters that have actually been provided is allocated.

The standard delay call parameter list may also be used by other mechanisms that have callback functions. To facilitate the use as part of other mechanisms macros have been provided to set up the standard delay call storage structures. Macros had to be used since un-named parameters cannot be passed "through" a function to another function. Additional functions have been provided to use the delay call structures after they have been built. The following are the exported macros and functions along with descriptions of their use.

DELAY_CALL_INFO_SIZE_MAX returns the maximum size of delayCallInfo; i.e. (sizeof(struct delayCall Info).) DELAY_CALL_INFO_SIZE(_numberOfArguments) returns the required size for the given number of arguments.

DELAY_CALL_ALLOCATE(_ptr, _numberOfArguments) allocates dynamic storage for the delay call information. If successful, _ptr will point to the storage. If it fails, _ptr will be NULL. When this macro is used, the internal allocation bit is automatically set.

DELAY_CALL_DEALLOCATE(_ptr) de-allocates the storage pointed to by _ptr. It is assumed to point to valid call information, and this macro only performs the de-allocate if the storage was allocated by DELAY_CALL_ALLOCATE (the internal allocation bit is set.)

DELAY_CALL_BUILD(_ptr, _function, _numberOfArguments) is used to build the delay call information. It must be called in a function with the standard delay call parameter list. The _ptr is a pointer to the storage provided for the call information. Only the portion of the storage will be updated that is required for the given number of arguments. This macro handles reading and storing all the un-named parameters.

DELAY_CALL_INSERT_PARAM(_ptr, _paramNumber, _param) shifts all current parameters down, and insert the given parameter at the given parameter number if a parameter needs to be inserted into a delay call parameter list. Valid call information to be modified is pointed to by _ptr. It also will increase the count of the number of parameters the function will be given when it is called. This should be used when a user provides a function and some of the parameters to some lower level code and that code provides the rest of the parameters before calling the given function. The first parameter in the delayed function call is indexed as 0, the second one indexed by 1, etc. Asserts prevent adding parameters past the limit.

DELAY_CALL_CHANGE_PARAM(_ptr, _paramNumber, _param) changes the given numbered parameter to the given parameter. Valid call information to be modified is pointed to by _ptr.

DELAY_CALL_SET_AUTO_DEALLOCATE(_ptr) sets the auto de-allocate flag. This macro does not need to be called unless DELAY_CALL_ALLOCATE was not called, and the user wants the storage to be automatically de-allocated. Use of this macro should be avoided.

DELAY_CALL_CLEAR_AUTO_DEALLOCATE(_ptr) clears the auto de-allocate flag. This macro does not need to be called unless DELAY_CALL_ALLOCATE was called and the user does not want the storage to be automatically de-allocated. This does have uses if call information is built in dynamic storage and copied into static storage. However, use of this macro should be avoided. Due to fragmentation, do not allocate dynamic storage and keep it allocated for long periods of time. If call information needs to be kept around for periodic calling, allocate a static buffer.

Void *delayCallBuild(void *function, U32 numberOfArguments, . . . ) builds delay call information in dynamically allocated storage for the given function. If storage cannot be allocated, NULL is returned. If the user provides NULL for the function pointer, NULL is returned.

Void delayCallSchedule(void *callInfo) takes a pointer to delay call information and allocates a NIOP and schedules it to execute the delay call information. The NIOP is automatically de-allocated when the function executes. The storage for the call information is also de-allocated if the internal allocation bit is set.

Void delayCallTimeSchedule(void *callInfo, U32 waitTime) takes a pointer to delay call information and allocates a NIOP and schedules it to execute the delay call information after the given delay. The NIOP is automatically de-allocated when the function executes. The storage for the call information is also de-allocated if the internal allocation bit is set.

U32 delayCallExecute(void *callInfo) takes a pointer to delay call information and executes the function immediately in the current context. The function returns the value returned by the function being executed. If the function is of void type, then garbage is returned. The storage for the call information is also de-allocated if the internal allocation bit is set.

Void displayCallInfo(void *callInfo) displays the call information structure. Void displayCallInfoShort(void *callInfo) displays a one line cryptic version of the information.

When executing a function on the partner controller, the call information structure has to be sent to the partner. The call information is built in a dynamic buffer. Then a DMA target buffer on the partner is allocated. Each controller keeps track of the DMA target buffers on the other controller (currently 256 buffers.) The data is then sent to this buffer, and an interrupt is sent with the address of the call information. The other controller then allocates a dynamic buffer, copies the data from the DMA target buffer to the dynamic buffer and schedules it to execute. At this point status is returned to the initiating controller. When status is received, the initiating controller de-allocates the dynamic buffer and the DMA target buffer. The following structures are used to maintain the DMA target buffers on the partner controller.

DELAY_CALL_PARTNER_BUFFERS (256)
struct delayCallInfo delayCallPartnerBuffer[DELAY_CALL_PARTNER_BUFFERS];
GEN_BIT_MAP_STRUCT_STATIC (delayCallPartnerAllocation, DELAY_CALL_PARTNER_BUFFERS);

The process illustrated above with reference to FIGS. 3–26 may be tangibly embodied in a computer-readable medium or carrier, e.g. one or more of the fixed and/or removable data storage devices 290 illustrated in FIG. 2, or other data storage or data communications devices. The computer program 292 may be loaded into the memory 212 or directly into the CPU 210 to configure the CPU 210 of FIG. 2, for execution. The computer program 292 comprise instructions which, when read and executed by the CPU 210 of FIG. 2, causes the CPU 210 to perform the steps necessary to execute the steps or elements of the present invention.

In summary, the present invention provides a method and apparatus for emulating shared memory in a storage system, wherein the storage system is configured such that data is synchronized between controllers in an easy to use manner that simplifies firmware development.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computer system comprising:
   a first computer comprising:
      a first control program;
      a first memory region addressable by a first application program executing in said first computer; and
a first buffer; and
a second computer comprising:
   a second control program;
   a second memory region addressable by a second application program executing in said second computer, and
   a second buffer; and wherein
said first application requests to update data in said first memory region, and in response, said first control program determines if any application in said first or second computer currently has an exclusive lock on both said first memory region and said second memory region, and if not, said first control program obtains the lock for said first application and if said first buffer has a more current version of said data than said first memory region, said first control program copies said more current version of said data from said first buffer to said first memory region for update by said first application, and after said first application updates said data in said first memory region, said first control program writes the updated data from said first memory region to said first buffer, subsequently sends the updated data from said first buffer to said second buffer, and subsequently releases said lock.

2. A computer system as set forth in claim 1 wherein subsequently:
   said second application requests to update data in said second memory region, and in response, said second control program determines if any application in said first or second computer currently has an exclusive lock on both said first memory region and said second memory region, and if not, said second control program obtains the lock for said second application and if said second buffer has a more current version of said data than said second memory region, said second control program copies said more current version of said data from said second buffer to said second memory region for update by said second application, and after said second application updates said data in said second memory region, said second control program writes the data updated by said second application from said second memory region to said second buffer, subsequently sends the data updated by said second application from said second buffer to said first buffer, and subsequently releases said lock.

3. A computer system as set forth in claim 2 wherein:
said first computer further comprises a third buffer;
said second computer further comprises a fourth buffer; and
before said second control program sends the data updated by said second application from said second buffer to said first buffer, said first control program or said second control program determines that said first buffer has an older version of said data than said third buffer.

4. A computer system as set forth in claim 1 wherein:
said first computer further comprises a third buffer;
said second computer further comprises a fourth buffer; and
before said first control program sends the updated data from said first buffer to said second buffer, said first control program or said second control program determines that said second buffer has an older version of said data than said fourth buffer.

5. A computer system as set forth in claim 1 wherein said first application subsequently requests to lock said data in said first memory region for update again, and in response, said first control program determines if any application in said first or second computer currently has an exclusive lock on both said first memory region and said second memory region, and if not, said first control program obtains the lock for said first application and if said first buffer has a more current version of said data than said first memory region, said first control program copies said more current version of said data from said first buffer to said first memory region for update by said first application, and if said first application does not update said data again, said first application notifies said first control program not to write the contents of said first memory region to said first buffer or send the contents of said first buffer to said second buffer, and releases said lock.

6. A computer system as set forth in claim 1 wherein said first computer is a first storage controller; said second computer is a second storage controller; and both storage controllers control same external storage.

7. A computer system as set forth in claim 1 wherein said second computer does not copy the updated data from said second buffer to said second memory region in response to said updated data being sent from said first buffer to said second buffer, whereby said second computer avoids corresponding overhead when an application in said first computer obtains a next exclusive lock on both said first memory region and said second memory and again updates said data in said first memory region.

8. A computer program product comprising:
   a computer readable medium;
   first program instructions for execution in a first computer;
   second program instructions for execution in said first computer to define in said first computer a first memory region addressable by a first application program executing in said first computer; and
   third program instructions for execution in said first computer to define in said first computer a first buffer;
   fourth program instructions for execution in a second computer;
   fifth program instructions for execution in said second computer to define in said second computer a second memory region addressable by a second application program executing in said second computer; and
   sixth program instructions for execution in said second computer to define in said second computer a second buffer; and
   seventh program instructions to define an exclusive lock on both said first and second memory regions; and wherein
said first application requests to update data in said first memory region, and in response, said first program instructions determine if any application in said first or second computer currently has the lock on said first memory region and said second memory region, and if not, said first program instructions obtain the lock for said first application and if said first buffer has a more current version of said data than said first memory region, said first program instructions copy said more current version of said data from said first buffer to said first memory region for update by said first application, and after said first application updates said data in said first memory region, said first program instructions write the updated data from said first memory region to said first buffer, subsequently send the updated data from said first buffer to said second buffer, and subsequently release said lock; and said first, second, third, fourth, fifth, sixth and seventh program instructions are recorded on said medium.

9. A computer program product as set forth in claim 8 wherein subsequently:
said second application requests to update data in said second memory region, and in response, said fourth program instructions determine if any application in said first or second computer currently has the lock on said first memory region and said second memory region, and if not, said second fourth program instructions obtain the lock for said second application and if said second buffer has a more current version of said data than said second memory region, said second fourth program instructions copy said more current version of said data from said second buffer to said second memory region for update by said second application, and after said second application updates said data in said second memory region, said second fourth program instructions write the data updated by said second application from said second memory region to said second buffer, subsequently send the data updated by said second application from said second buffer to said first buffer, and subsequently release said lock.

10. A computer program product as set forth in claim 9 wherein:
said third program instructions further define a third buffer in said first computer;
said sixth program instructions further define a fourth buffer in said second computer; and
before said fourth program instructions write the data updated by said second application from said second buffer to said first buffer, said first program instructions or said fourth program instructions determine that said first buffer has an older version of said data than said third buffer.

11. A computer program product as set forth in claim 8 wherein:
said third program instructions further define a third buffer in said first computer;
said fourth program instructions further define a fourth buffer in said second computer; and
before said first program instructions write the updated data from said first buffer to said second buffer, said first program instructions or said fourth program instructions determine that said second buffer has an older version of said data than said fourth buffer.

12. A computer program product as set forth in claim 8 wherein said first application subsequently requests to update again said data in said first memory region, and in response, said first program instructions determine if any application in said first or second computer currently has the lock for said first or second memory regions, and if not, said first program instructions obtain the lock for said first application and if said first buffer has a more current version of said data than said first memory region, said first program instructions copy said more current version data from said first buffer to said first memory region for update by said first application, and if said first application does not update said data again, said first application notifies said first program instructions not to write the contents of said first memory region to said first buffer or write the contents of said first buffer to said second buffer, and subsequently release said lock.

13. A computer program product as set forth in claim 8 wherein said first computer is a first storage controller; said second computer is a second storage controller; and both storage controllers control same external storage.

14. A computer program product as set forth in claim 8 wherein said second computer does not copy the updated data from said second buffer to said second memory region in response to said updated data being sent from said first buffer to said second buffer, whereby said second computer avoids corresponding overhead when an application in said first computer obtains a next lock on said first memory region and said second memory and updates data in said first memory region.

15. A computer system comprising:
a first computer comprising:
a first control program;
a first memory region addressable by a first application program executing in
said first computer; and
a first buffer;
a second computer comprising:
a second control program;
a second memory region addressable by a second application program
executing in said second computer; and
a second buffer; and
an exclusive lock for both said first and second memory regions; and wherein
said first application requests to update data in said first memory region, and in response, said first control program determines if any application in said first or second computer currently has the lock for said first or second memory regions, and if not, said first control program obtains the lock for said first application, partially updates said data and subsequently notifies said second application to read said partially updated data, and said second application reads said partially updated data while said first application retains said lock, and after said second application reads said partially updated data, said first application completes the update of said data in said first memory region.

16. A computer system as set forth in claim 15 wherein said first computer is a first storage controller; said second computer is a second storage controller; and both storage controllers control same external storage.

* * * * *